United States Patent
Ikeda et al.

(10) Patent No.: US 11,115,580 B2
(45) Date of Patent: Sep. 7, 2021

(54) COMMUNICATION SYSTEM, COMMUNICATION APPARATUS, IMAGE CAPTURE APPARATUS, CONTROL METHOD FOR COMMUNICATION APPARATUS, AND STORAGE MEDIUM

(71) Applicant: CANON KABUSHIKI KAISHA, Tokyo (JP)

(72) Inventors: Kaori Ikeda, Kawasaki (JP); Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 16/220,067

(22) Filed: Dec. 14, 2018

(65) Prior Publication Data
US 2019/0191074 A1   Jun. 20, 2019

(30) Foreign Application Priority Data
Dec. 19, 2017   (JP) .............................. JP2017-243090

(51) Int. Cl.
*H04N 5/232*   (2006.01)
*H04W 4/80*   (2018.01)
(Continued)

(52) U.S. Cl.
CPC ..... *H04N 5/23206* (2013.01); *H04N 5/23241* (2013.01); *H04N 5/23245* (2013.01);
(Continued)

(58) Field of Classification Search
CPC ........... H04N 5/23206; H04N 5/23241; H04N 5/23245; H04N 5/23293; H04W 48/02;
(Continued)

(56) References Cited

U.S. PATENT DOCUMENTS

| 9,596,336 B2* | 3/2017 | Takagi | H04M 1/72527 |
| 2011/0154084 A1* | 6/2011 | Vandwalle | G06F 1/32 |
| | | | 713/324 |

(Continued)

FOREIGN PATENT DOCUMENTS

| EP | 2887747 A1 | 6/2015 |
| JP | 2017-144627 A | 8/2017 |

OTHER PUBLICATIONS

May 23, 2019 Combined Search and Examination Report in United Kingdom Patent Appln. No. GB1820542.7.

*Primary Examiner* — Nhan T Tran
(74) *Attorney, Agent, or Firm* — Venable LLP

(57) ABSTRACT

In a communication system comprising a first communication apparatus and a second communication apparatus, the first communication apparatus transmits a first notification for connection processing in short-range wireless communication during an operation in a first power mode, and transmits a second notification, different from the first notification, for the connection processing in the short-range wireless communication during an operation in a second power mode in which power is saved more than in the first power mode. The second communication apparatus starts, if the first notification is received, the connection processing at an arbitrary timing, and starts, if the second notification is received, the connection processing at a timing restricted as compared to the case in which the first notification is received.

27 Claims, 22 Drawing Sheets

(51) Int. Cl.
*G08B 5/22* (2006.01)
*H04W 48/02* (2009.01)

(52) U.S. Cl.
CPC .......... *H04N 5/23293* (2013.01); *H04W 4/80* (2018.02); *H04W 48/02* (2013.01); *G08B 5/225* (2013.01)

(58) Field of Classification Search
CPC ... H04W 4/80; H04W 68/00; H04W 52/0229; H04W 48/08; H04W 76/10; H04W 76/14; H04W 40/246; G08B 5/225
See application file for complete search history.

(56) References Cited

U.S. PATENT DOCUMENTS

| | | | |
|---|---|---|---|
| 2014/0119252 | A1 | 5/2014 | Kella et al. |
| 2014/0378059 | A1* | 12/2014 | Ouchi ............... H04W 4/80 455/41.2 |
| 2017/0078864 | A1* | 3/2017 | Kawai ............... H04W 4/06 |
| 2017/0214784 | A1* | 7/2017 | Masuoka ............ G08C 17/02 |
| 2017/0353922 | A1 | 12/2017 | Shirakawa |
| 2018/0098338 | A1* | 4/2018 | Choi ................. H04L 29/08 |
| 2018/0316788 | A1* | 11/2018 | Elliott .............. H04W 4/02 |
| 2019/0150215 | A1* | 5/2019 | Li ................... H04W 4/80 370/329 |
| 2019/0166490 | A1* | 5/2019 | Lee .................. H04W 76/11 |

* cited by examiner

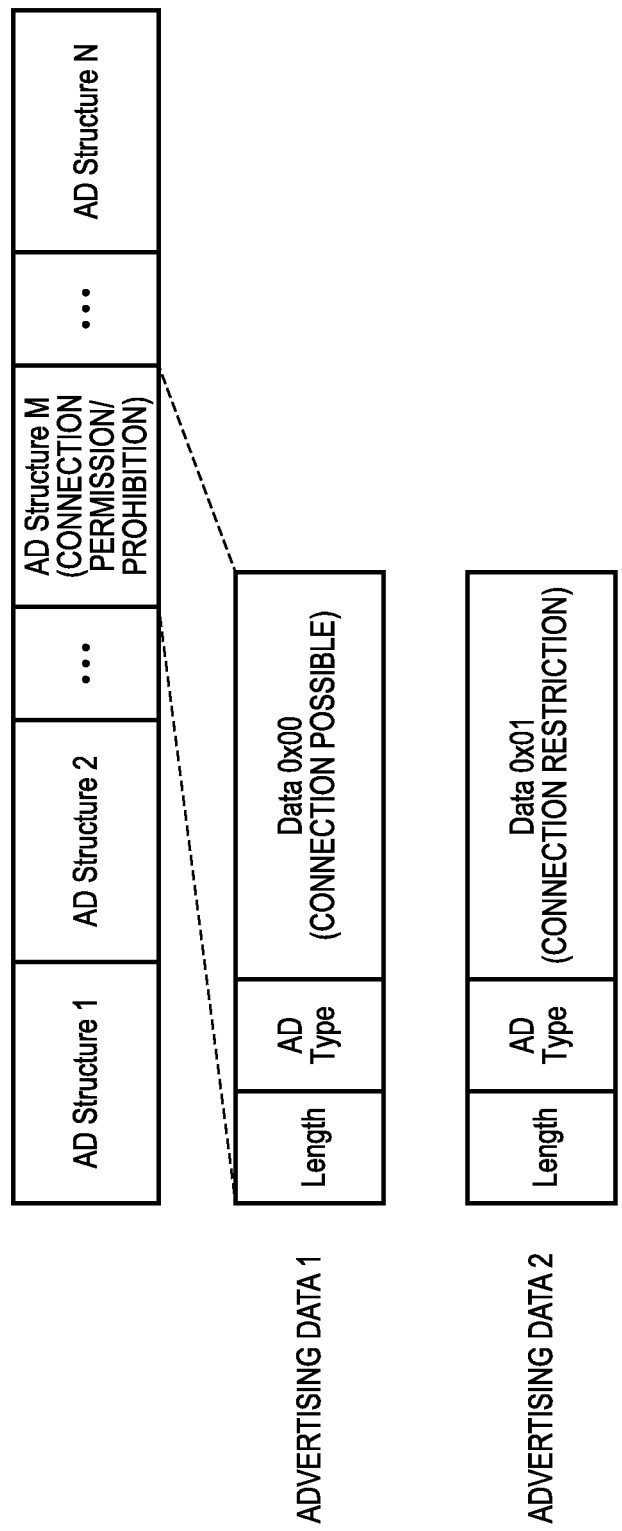

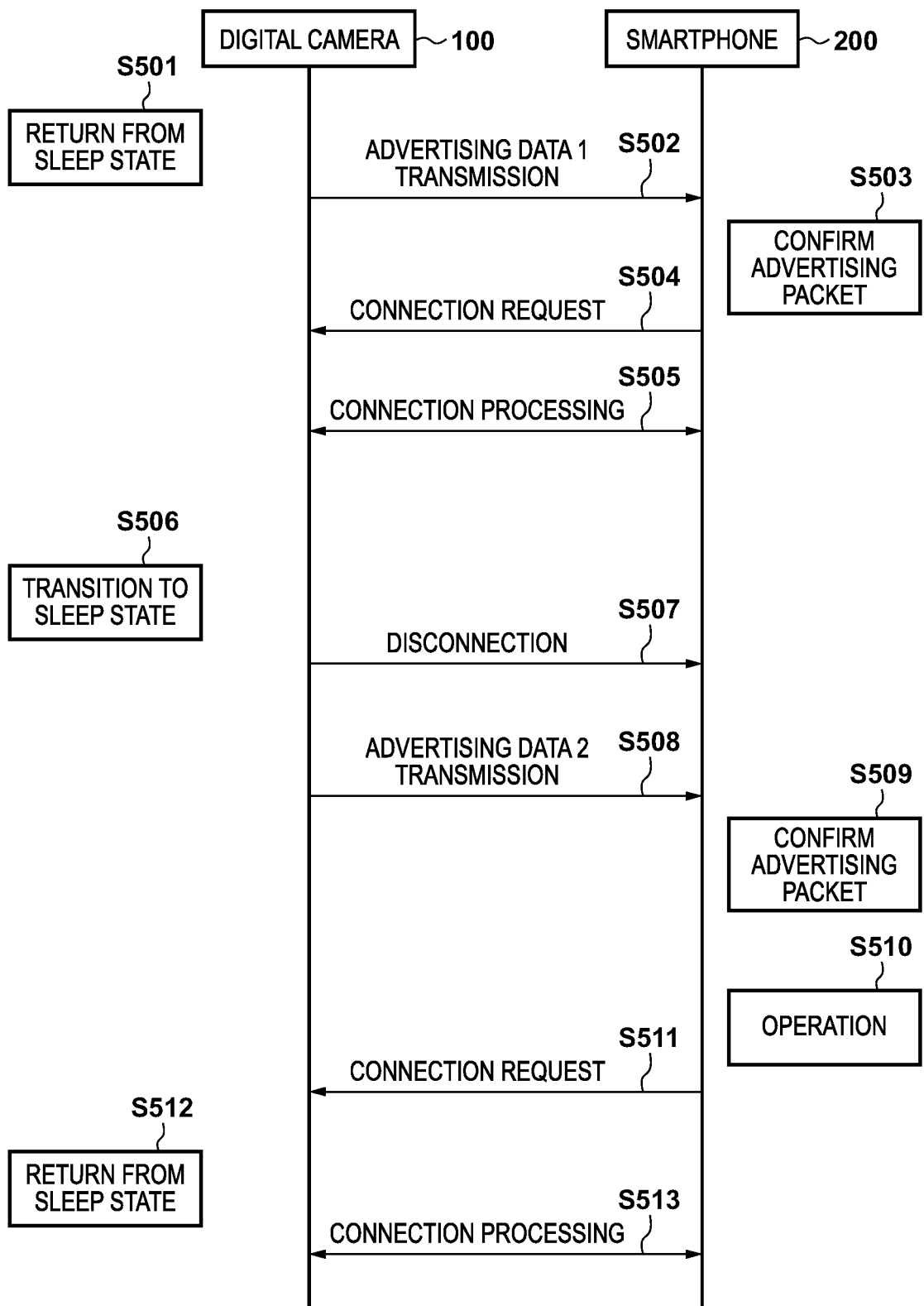

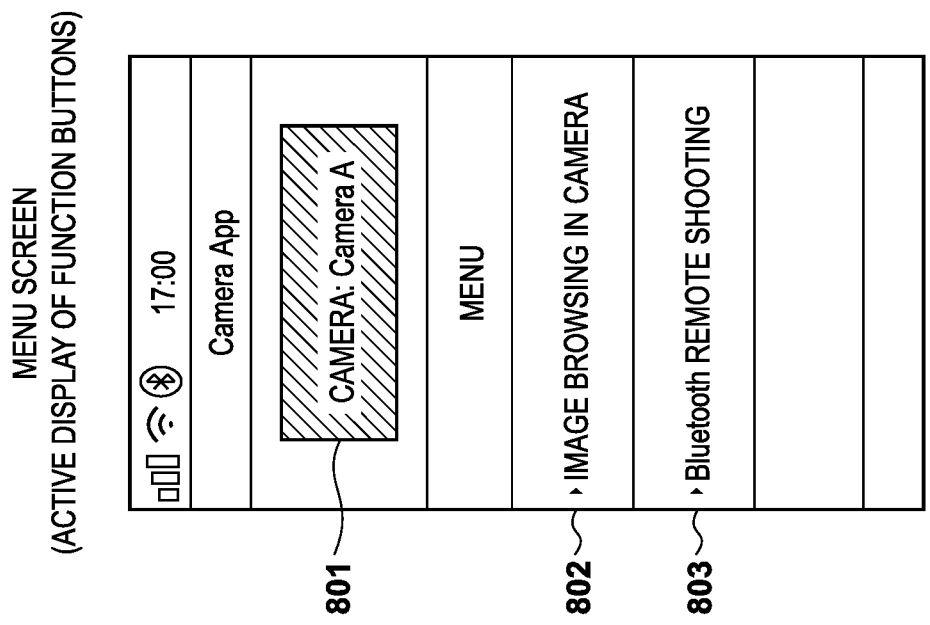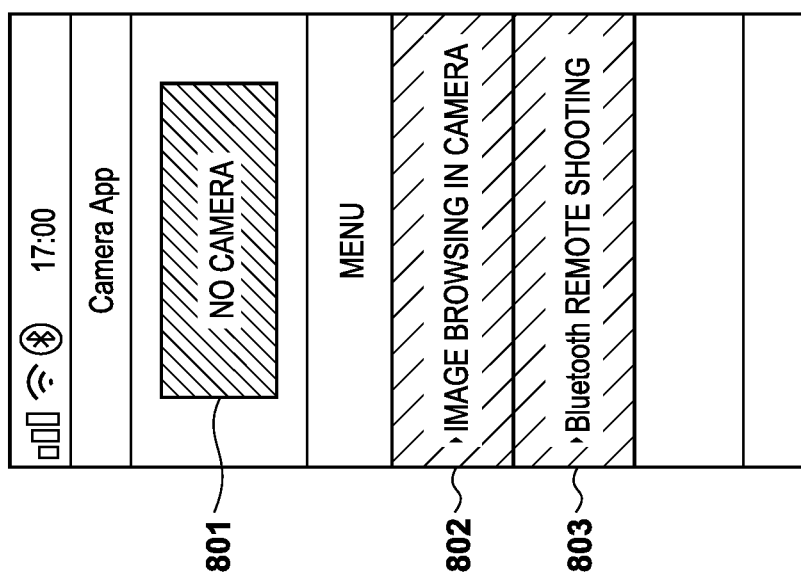

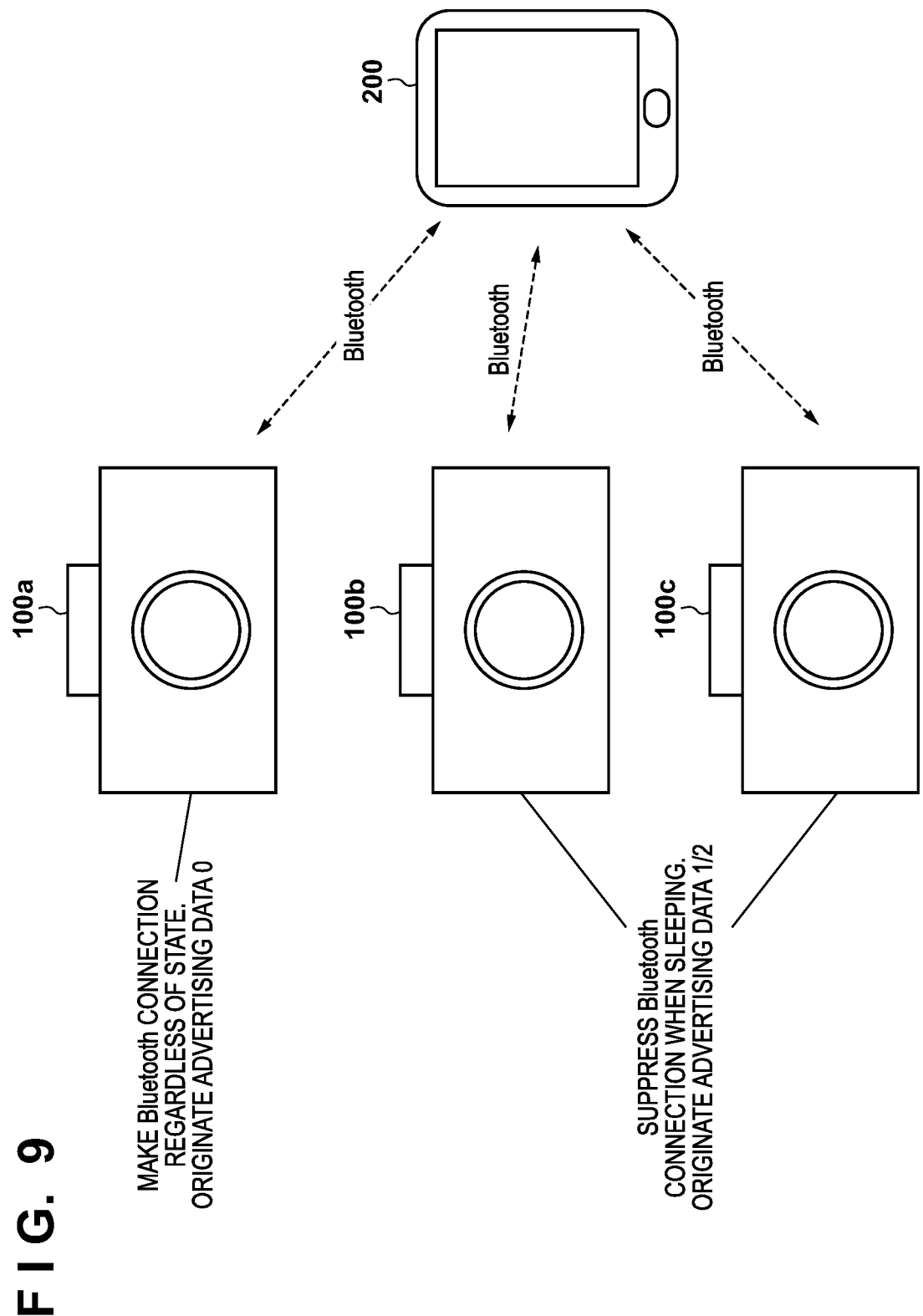

F I G. 10

| ADVERTISING DATA 0 | AD Structure 1 | AD Structure 2 | ... | AD Structure M | ... | AD Structure N |

F I G. 11D

| DEVICE NAME | COMMUNICATION STATE | PRESENCE/ABSENCE OF DISPLAY |
|---|---|---|
| Camera A | CURRENTLY Bluetooth-CONNECTED | DISPLAY |
| Camera B | ADVERTISING DATA 2 | DISPLAY |
| Camera C | CONNECTION REQUEST IN PROGRESS | DO NOT DISPLAY |

1151  1152  1153

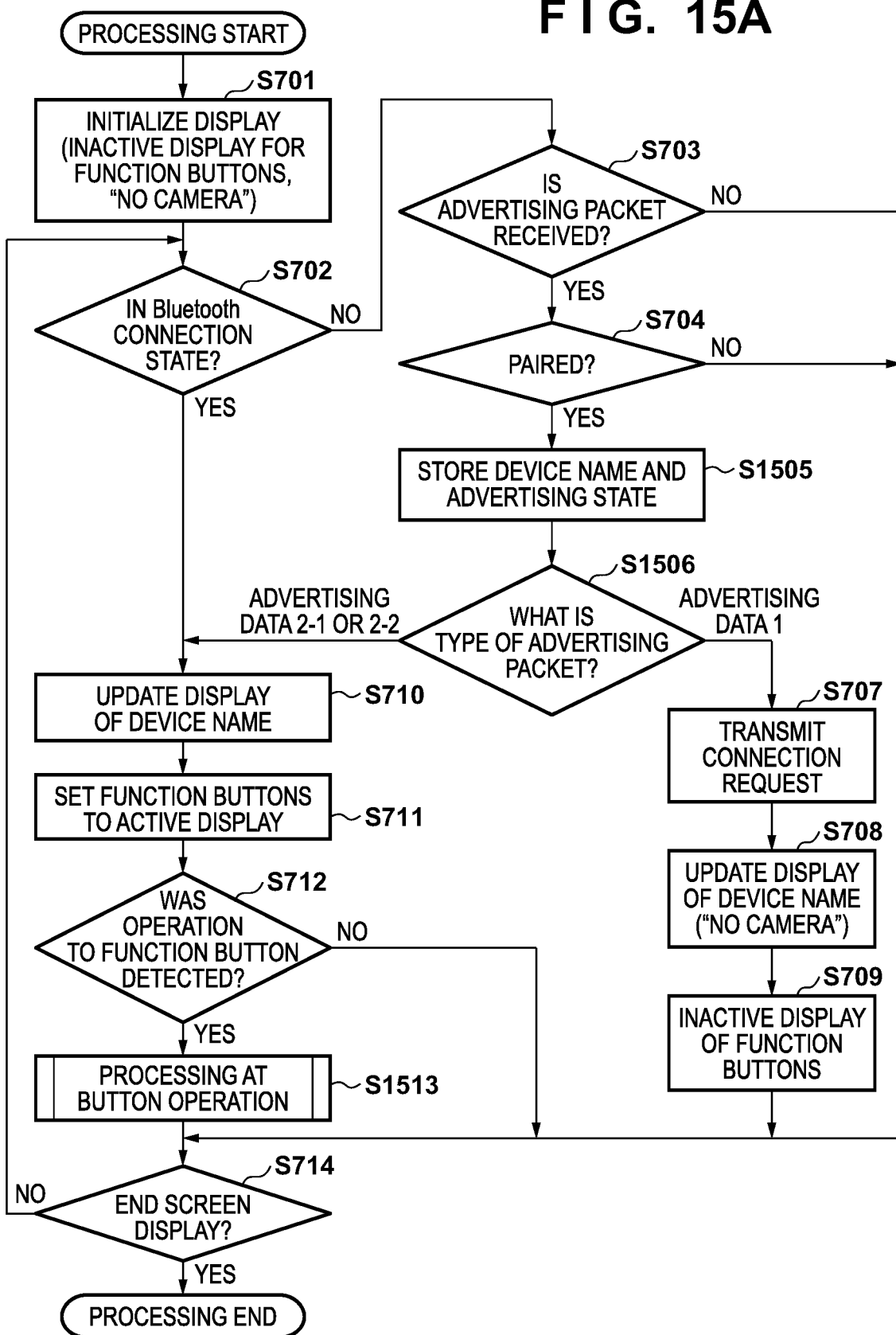
F I G. 15A

COMMUNICATION SYSTEM, COMMUNICATION APPARATUS, IMAGE CAPTURE APPARATUS, CONTROL METHOD FOR COMMUNICATION APPARATUS, AND STORAGE MEDIUM

BACKGROUND OF THE INVENTION

Field of the Invention

The present invention relates to a communication system, a communication apparatus, an image capture apparatus, a control method for a communication apparatus, and a storage medium.

Description of the Related Art

In recent years, there has been proposed a technique of performing wireless communication between a digital camera and a smartphone and operating the digital camera from the smartphone. There has also been proposed a technique in which when the digital camera is in a sleep state for power saving, the digital camera receives wireless communication from the smartphone to return from the sleep state. A technique of performing this kind of wireless communication using short-range wireless communication such as Bluetooth® with power consumption lower than that of wireless LAN is attracting attention.

The use of power-saving short-range wireless communication (for example, Bluetooth connection) enables, for example, the digital camera to continue Bluetooth connection to the smartphone even in the sleep state in which low power consumption is required. Thus, even in the sleep state, the user can remotely operate the digital camera using the smartphone at an arbitrary timing, and return the digital camera from the sleep state. The remote operation of the digital camera by the smartphone makes it possible to, for example, remotely perform a shooting operation of the digital camera and browse images in the digital camera on the screen of the smartphone.

Although the power consumption is lower than that of wireless LAN communication, if Bluetooth communication is performed while the digital camera is in the sleep state, power is always consumed in the sleep state. To solve this problem, Japanese Patent Laid-Open No. 2017-144627 proposes a technique of reducing the power consumption by controlling, by an apparatus having a plurality of sleep modes, an advertising packet transmission interval in accordance with the sleep mode.

However, in the arrangement described in Japanese Patent Laid-Open No. 2017-144627, communication connection is established automatically in accordance with a response to an advertising packet. As a result, inconvenience that the apparatus is activated at a timing unintended by the user may occur. In addition, the arrangement poses a problem that activation at a timing unintended by the user causes wasteful power consumption.

SUMMARY OF THE INVENTION

An embodiment of the present invention provides a technique of controlling establishment of short-range wireless connection more appropriately.

According to a first aspect of the present invention, there is provided a communication system comprising a first communication apparatus and a second communication apparatus, the first communication apparatus comprising: a unit configured to transmit a first notification for connection processing in short-range wireless communication during an operation in a first power mode, and a unit configured to transmit a second notification, different from the first notification, for the connection processing in the short-range wireless communication during an operation in a second power mode in which power is saved more than in the first power mode, and the second communication apparatus comprising: a receiving unit configured to receive one of the first notification and the second notification transmitted by the first communication apparatus, and a unit configured to start, if the first notification is received, the connection processing at an arbitrary timing, and starting, if the second notification is received, the connection processing at a timing restricted as compared to the case in which the first notification is received.

According to a second aspect of the present invention, there is provided a communication apparatus configured to operate in either a first power mode or a second power mode in which power is saved more than in the first power mode, the apparatus comprising: a unit configured to transmit a notification for connection processing in short-range wireless communication; and a unit configured to perform a transition of a power mode from the first power mode to the second power mode, wherein the unit configured to transmit is configured to transmit a first notification, as the notification, during an operation in the first power mode, and transmit a second notification, as the notification, including restriction information for executing connection processing at a timing restricted as compared to the first notification, during an operation in the second power mode.

According to a third aspect of the present invention, there is provided a communication apparatus comprising: a unit configured to receive a notification for short-range wireless communication from an external communication apparatus; a unit configured to determine whether the received notification includes restriction information indicating that a timing of executing connection processing in the short-range wireless communication is restricted; and a unit configured to transmit, if the restriction information is not included, a connection request for the connection processing at a first timing, and transmit, if the restriction information is included, the connection request at a second timing restricted more than the first timing.

According to a fourth aspect of the present invention, there is provided an image capture apparatus comprising: a communication apparatus defined in the second aspect; an image capture unit; and a storage unit configured to store an image shot by the image capture unit.

According to a fifth aspect of the present invention, there is provided a control method for a communication apparatus that operates in a first power mode and a second power mode in which power is saved more than in the first power mode, comprising: transmitting a first notification for connection processing in short-range wireless communication during an operation in the first power mode; performing transition of a power mode from the first power mode to the second power mode; and transmitting a second notification including restriction information for executing the connection processing at a timing restricted more than a timing of execution of the connection processing by the first notification, during an operation in the second power mode.

According to a sixth aspect of the present invention, there is provided a control method for a communication apparatus, comprising: receiving a notification for short-range wireless communication from an external communication apparatus; determining whether the notification received in the receiving includes restriction information indicating that a timing of executing connection processing in the short-range wireless communication is restricted; and transmitting, if the restriction information is not included, a connection request for the connection processing at a first timing, and transmitting, if the restriction information is included, the connection request at a second timing restricted more than the first timing.

According to a seventh aspect of the present invention, there is provided a non-transitory computer-readable storage medium storing a program for causing a computer to execute a control method defined in the fifth aspect or sixth aspect.

Further features of the present invention will become apparent from the following description of exemplary embodiments (with reference to the attached drawings).

BRIEF DESCRIPTION OF THE DRAWINGS

FIG. 4 is a view showing examples of an advertising packet of the digital camera according to the first embodiment;

FIG. 5 is a sequence chart showing a sequence when the digital camera returns from the sleep state, and then transits to the sleep state, and the smartphone is operated in the sleep state according to the first embodiment;

FIGS. 8A and 8B are views each showing an example of menu display on the smartphone according to the first embodiment;

FIG. 9 is a view showing an example of the network arrangement of digital cameras and a smartphone according to the second embodiment;

FIG. 10 is a view showing an example of an advertising packet of the digital camera according to the second embodiment;

FIG. 11D is a table showing an example of a device list stored in the smartphone according to the second embodiment;

FIG. 15A is a flowchart illustrating the procedure of display processing and processing according to a user operation in a smartphone according to the third embodiment;

DESCRIPTION OF THE EMBODIMENTS

A mode for carrying out the present invention will be described in detail below with reference to the accompanying drawings. Note that the following embodiments are merely examples of an implementation means of the present invention and can be appropriately modified or changed depending on various conditions and arrangements of apparatuses to which the present invention is applied. Furthermore, the embodiments can be combined as appropriate.

First Embodiment

<Arrangement of Digital Camera 100>

Figure 1:
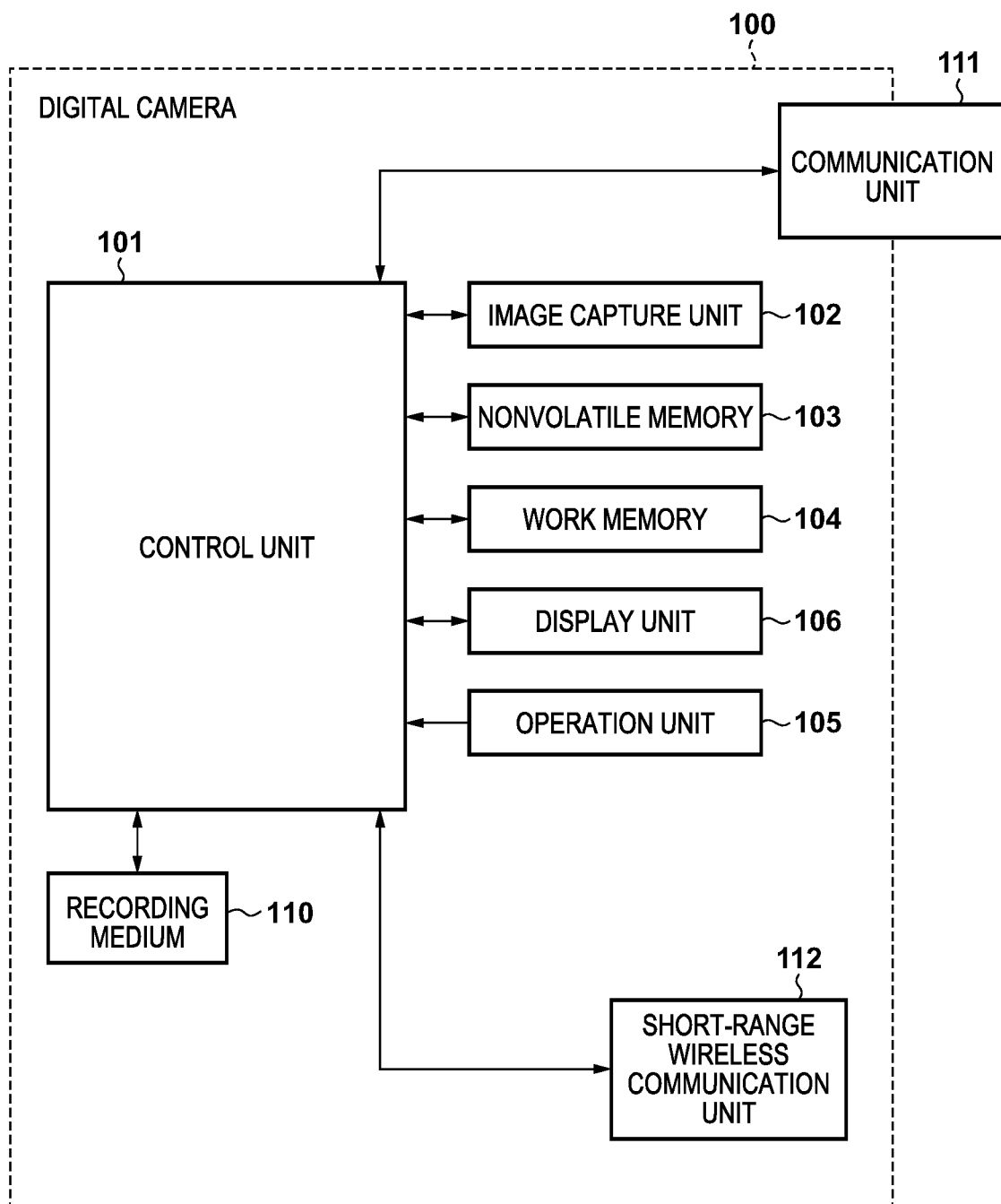
FIG. 1 is a block diagram showing the arrangement of a digital camera according to the first embodiment.

FIG. 1 is a block diagram showing an example of the arrangement of the digital camera 100 as an example of the first communication apparatus according to the first embodiment. Note that an image capture apparatus (digital camera) will be described as an example of the first communication apparatus. However, the communication apparatus is not limited to this. For example, the first communication apparatus may be an information processing apparatus such as a portable media player, a so-called tablet device, or a personal computer.

A control unit 101 includes, for example, a CPU, and controls the respective units of the digital camera 100 in accordance with an input signal and a program (to be described later). The control unit 101 controls the overall apparatus by executing a program stored in a nonvolatile memory 103. Note that instead of controlling the overall apparatus by the control unit 101, a plurality of hardware components may control the overall apparatus by sharing processing.

An image capture unit 102 includes, for example, an optical lens unit, an optical system for controlling the stop, zoom, focus, and the like, and an image sensor for converting light (video) introduced via the optical lens unit into an electrical video signal. A CMOS (Complementary Metal Oxide Semiconductor) or CCD (Charge Coupled Device) is generally used as an image sensor. Under the control of the control unit 101, the image capture unit 102 causes the image sensor to convert, into an electrical signal, object light imaged by a lens included in the image capture unit 102, perform noise reduction processing and the like, and output digital data as image data. The digital camera 100 according to this embodiment records the image data in a recording medium 110 in accordance with the DCF (Design Rule for Camera File System) standard.

The nonvolatile memory 103 is an electrically erasable and recordable nonvolatile memory, and stores programs that, when executed by the control unit 101, implement respective processes (to be described later). A work memory 104 is used as a buffer memory for temporarily holding image data captured by the image capture unit 102, an image display memory for a display unit 106, a work area for the control unit 101, and the like.

An operation unit 105 is used to accept an instruction to the digital camera 100 from the user. The operation unit 105 includes, for example, a power switch used by the user to instruct ON/OFF of the power of the digital camera 100, a release switch used to instruct shooting, a moving image shooting switch used to instruct moving image shooting, and a playback button used to instruct playback of image data. The operation unit 105 includes an operation member such as a dedicated connection button used to start communication with an external apparatus via a communication unit 111 (to be described later). The operation unit 105 also includes a touch panel formed on the display unit 106 (to be described later). Note that when the release switch is set in a so-called halfway pressed state, the first switch is turned on, and when the release switch is set in a fully pressed state, the second switch is turned on. If the first switch is turned on, the control unit 101 starts shooting preparations for AF (Auto Focus) processing, AE (Auto Exposure) processing, AWB (Auto White Balance) processing, EF (flash pre-emission) processing, and the like. If the second switch is turned on, the control unit 101 executes shooting.

The display unit 106 displays a viewfinder image at the time of shooting, shot image data, characters for interactive operations, and the like. Note that the display unit 106 need not always be incorporated in the digital camera 100. The digital camera 100 can be connected to the internal or external display unit 106, and need only have at least a display control function of controlling display of the display unit 106. The recording medium 110 can record image data output from the image capture unit 102. The recording medium 110 may be detachable from the digital camera 100, or may be incorporated in the digital camera 100. That is, the digital camera 100 need only include at least a means for accessing the recording medium 110.

The communication unit 111 serves as an interface for performing connection to an external apparatus. The digital camera 100 can exchange data with the external apparatus via the communication unit 111. For example, the digital camera 100 can transmit, to the external apparatus via the communication unit 111, image data generated by the image capture unit 102. Note that in this embodiment, the communication unit 111 includes an interface for communicating with the external apparatus by a so-called wireless LAN complying with the IEEE 802.11 standard. The control unit 101 implements wireless communication with the external apparatus by controlling the communication unit 111. The communication method of the communication unit 111 is not limited to the wireless LAN and, for example, an infrared communication method or the like may be used. A short-range wireless communication unit 112 performs short-range wireless communication with the external apparatus. In this embodiment, as an example of the short-range wireless communication unit 112, a Bluetooth® wireless unit for executing Bluetooth communication is used. The short-range wireless communication unit 112 performs Bluetooth communication with the smartphone 200 (to be described later). Note that in this embodiment, an example of using BLE (Bluetooth Low Energy) among the Bluetooth communication standards will be exemplified. Even if, for example, the control unit 101 of the digital camera 100 is not energized, the communication unit 111 can operate when energized independently of the control unit 101. However, if the communication unit 111 does not cooperate with the control unit 101, implementable communication is limited. The communication unit 111 according to this embodiment can originate an advertising signal even if at least the control unit 101 is inactive.

The digital camera 100 with the above arrangement can operate in a plurality of power modes including the first and second power modes. In the second power mode, power is saved more than in the first power mode. If, for example, the operation unit 105 is operated to turn on the power switch, the digital camera 100 operates in a normal state as the first power mode. If the power switch is turned off, the digital camera 100 enters a sleep state as the second power mode. If the power switch is OFF in the sleep state, when the power switch of the operation unit 105 is turned on, the digital camera 100 returns from the sleep state to the normal state. The digital camera 100 has an auto power-off function of, when the digital camera 100 is left for a period exceeding a predetermined time in a non-operation state while the power switch is ON, automatically turning off the power for power saving to enter the sleep state. If the digital camera 100 is in the sleep state (to be also referred to as an auto power-off state hereinafter) by the auto power-off function, it returns from the sleep state to the normal state by operating the release switch or the playback button of the operation unit 105.

In the sleep state, the digital camera 100 performs Bluetooth connection to the smartphone 200 in response to a request from the smartphone 200, thereby returning from the sleep state. For example, if the digital camera 100 is fixed by a tripod or the like to perform shooting by a remote operation, it transits to the sleep state (auto power-off state) when it is left while the power switch is ON. At this time, the user can operate the smartphone 200 at an arbitrary timing to return the digital camera 100 from the sleep state, thereby causing the digital camera to perform shooting. If the digital camera 100 is left after the end of shooting, the power is automatically turned off again to enter the sleep state. Therefore, if the user performs no shooting, the digital camera 100 is in the sleep state, and thus unnecessary power consumption of the digital camera 100 is prevented.

<Arrangement of Smartphone 200>

Figure 2:
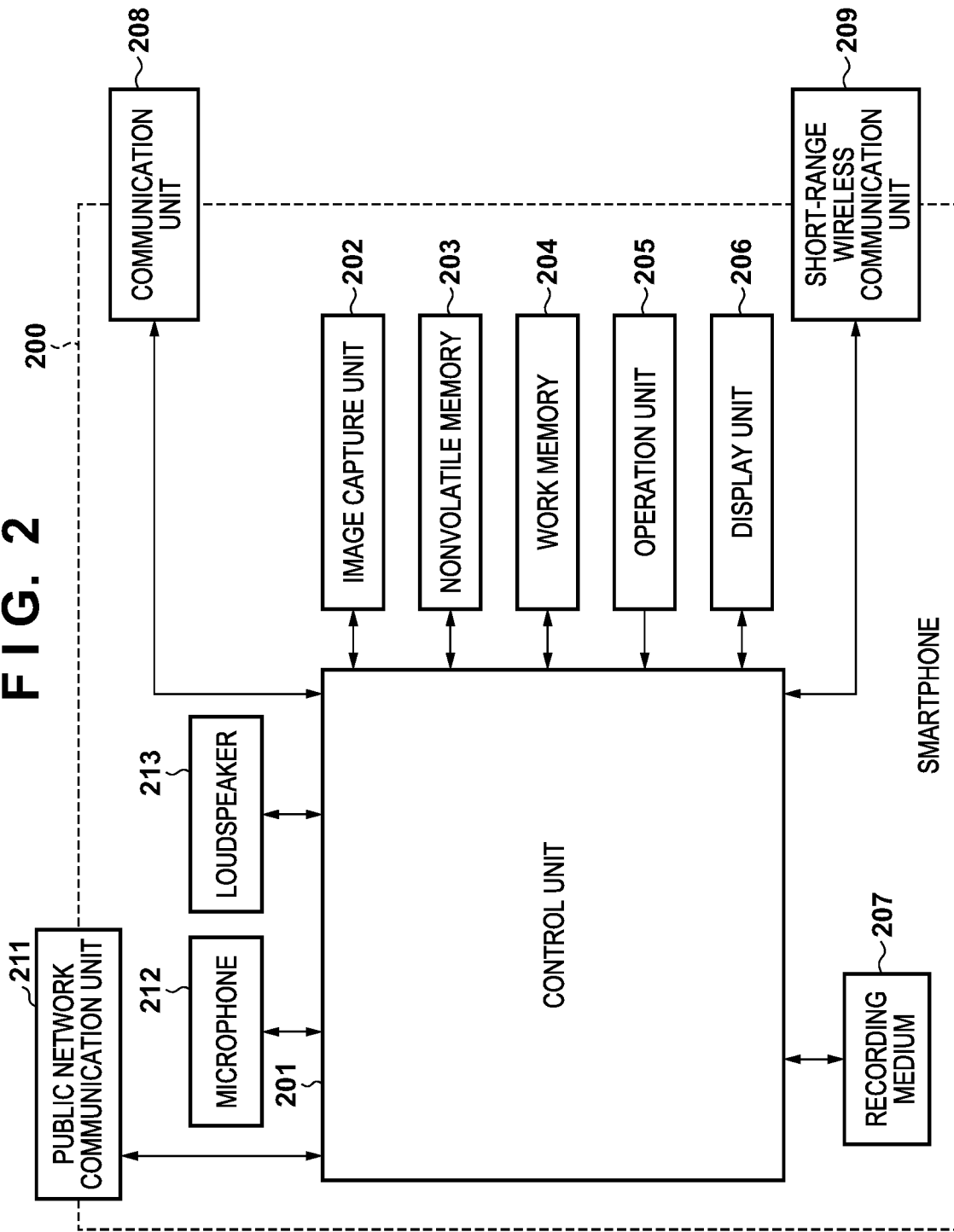
FIG. 2 is a block diagram showing the arrangement of a smartphone according to the first embodiment.

FIG. 2 is a block diagram showing an example of the arrangement of the smartphone 200 as an example of the second communication apparatus according to the first embodiment. Note that the smartphone will be described as an example of the information processing apparatus but the information processing apparatus is not limited to this. For example, the second communication apparatus may be a digital camera, tablet device, or personal computer having a wireless function, for example.

A control unit 201 includes, for example, a CPU, and controls the respective units of the smartphone 200 in accordance with an input signal and a program (to be described later). The control unit 201 controls the overall apparatus by executing a program stored in a nonvolatile memory 203. Note that instead of controlling the overall apparatus by the control unit 201, a plurality of hardware components may control the overall apparatus by sharing processing. An image capture unit 202 converts, into an electrical signal, object light imaged by a lens included in the image capture unit 202, performs noise reduction processing and the like, and outputs digital data as image data. The captured image data is accumulated in a buffer memory, undergoes predetermined calculation by the control unit 201, and is then recorded in the recording medium 207.

The nonvolatile memory 203 is an electrically erasable and recordable nonvolatile memory. The nonvolatile memory 203 stores an OS (Operating System) as basic software executed by the control unit 201, and an application for implementing a practical function in cooperation with the OS. In this embodiment, the nonvolatile memory 203 stores an application for performing remote control by communicating with the digital camera 100. A work memory 204 is used as an image display memory for a display unit 206, a work area for the control unit 201, and the like. An operation unit 205 is used to accept an instruction to the smartphone 200 from the user. The operation unit 205 includes, for example, operation members such as a power switch used by the user to instruct ON/OFF of the power of the smartphone 200, and a touch panel formed on the display unit 206.

The display unit 206 displays image data, characters for interactive operations, and the like. Note that the display unit 206 need not always be incorporated in the smartphone 200. The smartphone 200 can be connected to the display unit 206, and need only have at least a display control function of controlling display of the display unit 206. A recording medium 207 can record image data output from the image capture unit 202. The recording medium 207 may be detachable from the smartphone 200, or may be incorporated in the smartphone 200. That is, the smartphone 200 need only include at least a means for accessing the recording medium 207.

A communication unit 208 serves as an interface for performing connection to an external apparatus. The smartphone 200 can exchange data with the digital camera 100 via the communication unit 208. The communication unit 208 includes an antenna, and the control unit 201 can perform connection to the digital camera 100 by wireless communication via the communication unit 208. Note that connection to the digital camera 100 by the communication unit 208 may be direct connection or connection via an access point. As a protocol for communicating data, for example, PTP/IP (Picture Transfer Protocol over Internet Protocol) via a wireless LAN can be used. Note that communication between the communication unit 208 and the digital camera 100 is not limited to this. For example, the communication unit 208 can include an infrared communication module, a wireless communication module such as Wireless USB. Wired connection such as a USB cable, HDMI®, or IEEE 1394 may be adopted.

A short-range wireless communication unit 209 is, for example, a Bluetooth wireless unit for executing Bluetooth communication. Bluetooth communication with the digital camera 100 is performed via the short-range wireless communication unit 209. A public network communication unit 211 serves as an interface used to perform public wireless communication. The smartphone 200 can perform speech communication with another apparatus via the public network communication unit 211. At this time, the control unit 201 implements speech communication by inputting and outputting speech signals via a microphone 212 and a loudspeaker 213. In this embodiment, the public network communication unit 211 includes an antenna, and the control unit 201 can perform wireless connection to a public network via the public network communication unit 211. Note that the communication unit 208 and the public network communication unit 211 can share one antenna.

On the application for remote control which operates on the smartphone 200, the user can remotely control the digital camera 100. On the menu screen of the application, a control UI (to be sometimes referred to as a function button hereinafter) of a function for remotely controlling the digital camera 100 is arranged. The user can remotely control the digital camera 100 using the control UI. For example, by deciding the function to be used by the user by operating the function button, shot images recorded in the recording medium 110 of the digital camera 100 can be browsed on the smartphone 200 or remote shooting using the digital camera 100 can be performed on the smartphone 200.

<Arrangement of Communication System>

Figure 3:
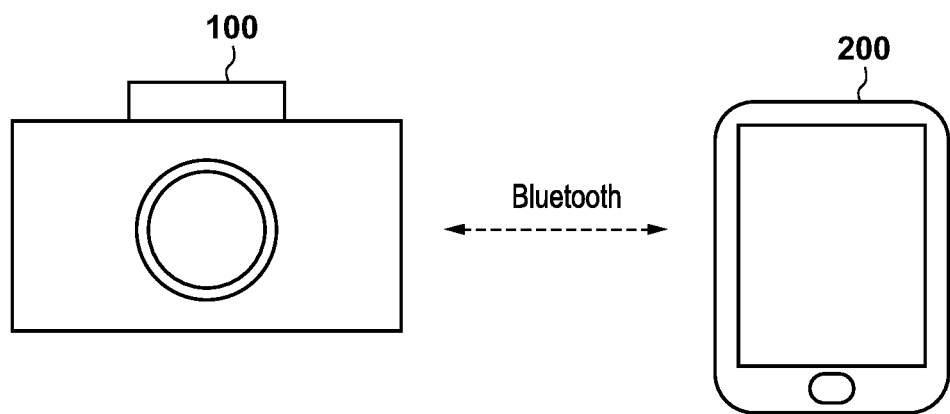
FIG. 3 is a view showing an example of the arrangement of a communication system according to the first embodiment.

FIG. 3 is a view schematically showing an example of a communication system according to the first embodiment. In the communication system according to the first embodiment, the digital camera 100 and the smartphone 200 perform Bluetooth communication. As shown in FIG. 3, the communication system is formed by the digital camera 100 and the smartphone 200, and they can communicate with each other by short-range wireless communication using the Bluetooth method.

<Example of Advertising Packet>

FIG. 4 is a view showing examples of an advertising packet used by the digital camera 100 according to the first embodiment. The advertising packet is a notification for connection processing in short-range wireless communication. The advertising packet includes a plurality of AD structures. Restriction information indicating the timing of Bluetooth connection is described in one of the AD structures. The digital camera 100 changes the information (value) in accordance with the power state (normal state or sleep state) of itself. In "AD type" of the AD structure, a code indicating a description of restriction information is described.

If the power switch of the digital camera 100 is ON and the digital camera 100 is not in the sleep state, the digital camera 100 uses advertising data 1 as an advertising packet in Bluetooth communication. Upon receiving the advertising data 1 from the digital camera 100, the smartphone 200 recognizes that Bluetooth connection of the digital camera 100 is not restricted. In this case, the smartphone 200 transmits a Bluetooth connection request to the digital camera 100. This enables the digital camera 100 to perform Bluetooth connection to the smartphone 200 when the digital camera 100 is not in the sleep state.

On the other hand, if the digital camera 100 is in the sleep state, the digital camera 100 uses advertising data 2 as an advertising packet in Bluetooth communication. Upon receiving the advertising data 2, the smartphone 200 recognizes that the timing of Bluetooth connection of the digital camera 100 should be restricted. Therefore, the smartphone 200 transmits no Bluetooth connection request to the digital camera 100 in response to reception of the advertising data 2. In this case, a Bluetooth connection request is issued by waiting for a predetermined operation from the user. Thus, if the digital camera 100 is in the sleep state, Bluetooth connection to the smartphone 200 is prevented from being unnecessarily performed at a timing unintended by the user.

If the user performs a predetermined operation for the smartphone 200, the smartphone 200 transmits a Bluetooth connection request to the digital camera 100. Thus, even if the digital camera 100 is in the sleep state, when a predetermined operation is performed in the smartphone 200, Bluetooth connection can be performed. In this embodiment, each advertising packet includes a character string indicating a device name as the name of the digital camera 100. The device name is displayed on the display unit 206 of the smartphone 200 that receives the advertising packet. This allows the user to identify the digital camera that is remotely controllable from the smartphone 200.

<Sequence Related to Transition to Sleep State and Returning from Sleep State of Digital Camera 100>

A sequence when the digital camera 100 returns from the sleep state, and then transits to the sleep state, and the smartphone 200 is operated when the digital camera 100 is in the sleep state will be described with reference to FIG. 5. Upon returning from the sleep state, the digital camera 100 is Bluetooth-connected to the smartphone 200. When transiting to the sleep state, the digital camera 100 disconnects the Bluetooth connection to the smartphone 200. When the user performs a predetermined operation for the smartphone 200 while the digital camera 100 is in the sleep state, the digital camera 100 returns from the sleep state, and is Bluetooth-connected to the smartphone 200.

At this time, assume that the digital camera 100 and the smartphone 200 have been paired to perform Bluetooth communication. Note that pairing indicates a state in which the apparatuses recognize each other as a communication partner apparatus, and registers information of each other. The smartphone 200 transmits a Bluetooth connection request in response to only the advertising packet from the paired digital camera 100. Even if the digital camera 100 receives a connection request from an apparatus other than the paired smartphone 200, it performs no Bluetooth connection.

In step S501, in response to an operation for a specific operation member (for example, the release switch or playback button) of the operation unit 105 in the auto power-off state, the digital camera 100 returns from the sleep state. After returning from the sleep state, the digital camera 100 transmits, in step S502, an advertising packet as the first notification for connection processing in short-range wireless communication. The advertising packet at this time is the advertising data 1 shown in FIG. 4 indicating that Bluetooth connection is not restricted.

Upon receiving the advertising packet, the smartphone 200 confirms the contents of the advertising packet in step S503, and determines whether Bluetooth connection is restricted. Since the advertising data 1 includes information indicating that Bluetooth connection is not restricted, the smartphone 200 determines that Bluetooth connection to the digital camera 100 is not restricted. Therefore, in step S504, the smartphone 200 transmits a Bluetooth connection request to the digital camera 100. Upon receiving the Bluetooth connection request from the smartphone 200, the digital camera 100 executes Bluetooth connection. In step S505, the digital camera 100 and the smartphone 200 are Bluetooth-connected.

After that, if the digital camera 100 is left in the non-operation state, the auto power-off function works, and the digital camera 100 transits, in step S506, to the sleep state by automatically turning off the power. At this time, the digital camera 100 disconnects the Bluetooth connection in step S507, and transmits, in step S508, an advertising packet as the second notification for connection processing in short-range wireless communication. The advertising packet transmitted at this time is the advertising data 2 of FIG. 4 which includes information indicating that Bluetooth connection is restricted. The advertising data 2 is an example of the second notification including restriction information for executing connection processing in short-range wireless communication at a timing restricted as compared to the advertising data 1 (first notification). This prevents the digital camera 100 from being activated for connection.

Upon receiving the advertising data 2, the smartphone 200 confirms the contents of the advertising data 2 in step S509, and determines whether Bluetooth connection is restricted. Since the advertising data 2 includes information indicating that Bluetooth connection is restricted, the smartphone 200 determines that Bluetooth connection to the digital camera 100 is restricted, and transmits no Bluetooth connection request.

After that, in step S510, the smartphone 200 detects that a predetermined operation has been performed for the operation unit 205. The predetermined operation is an operation for remotely controlling the digital camera 100. For example, the predetermined operation is an operation for the smartphone 200 for browsing, on the smartphone 200, shot images recorded in the recording medium 110 of the digital camera 100 or performing, on the smartphone 200, remote shooting using the digital camera 100. Upon detecting that the predetermined operation has been performed, the smartphone 200 transmits, in step S511, a Bluetooth connection request to the digital camera 100. In this case, since it is apparent that the user is to use the digital camera 100, even if the digital camera 100 is activated as a result of transmitting a Bluetooth connection request, this is not contrary to the intention of the user. Upon receiving the Bluetooth connection request from the smartphone 200, the digital camera 100 returns from the sleep state in step S512. In step S513, the digital camera 100 and the smartphone 200 are Bluetooth-connected.

As described above, if the digital camera 100 is in the sleep state, even if the smartphone 200 receives an advertising packet, no Bluetooth connection is performed immediately. When a predetermined operation is performed in the smartphone 200, the smartphone 200 performs Bluetooth connection to the digital camera 100. Thus, if the digital camera 100 is in the sleep state, the smartphone 200 can perform Bluetooth connection to the digital camera 100 in accordance with an operation even though the smartphone 200 does not maintain Bluetooth connection. This can return the digital camera 100 from the sleep state. According to this embodiment, by performing Bluetooth connection only when the user intends that Bluetooth connection is necessary, wasteful power consumption is prevented.

Note that the behavior when returning from the sleep state (auto power-off state) while the power switch is ON and entering the sleep state (auto power-off state) again has been described. Even if the digital camera returns from the sleep state by turning on the power switch when the power switch is OFF, and enters the sleep state by turning off the power switch again, the same procedure of connection of Bluetooth communication is performed. The short-range wireless communication unit 112 transmits the advertising data 1 during a first period, and transmits the advertising data 2 during a second period. The first and second periods may be the same but the second period is preferably longer than the first period from the viewpoint of power saving.

<Operation of Returning from Sleep State by Digital Camera 100>

Figure 6A:
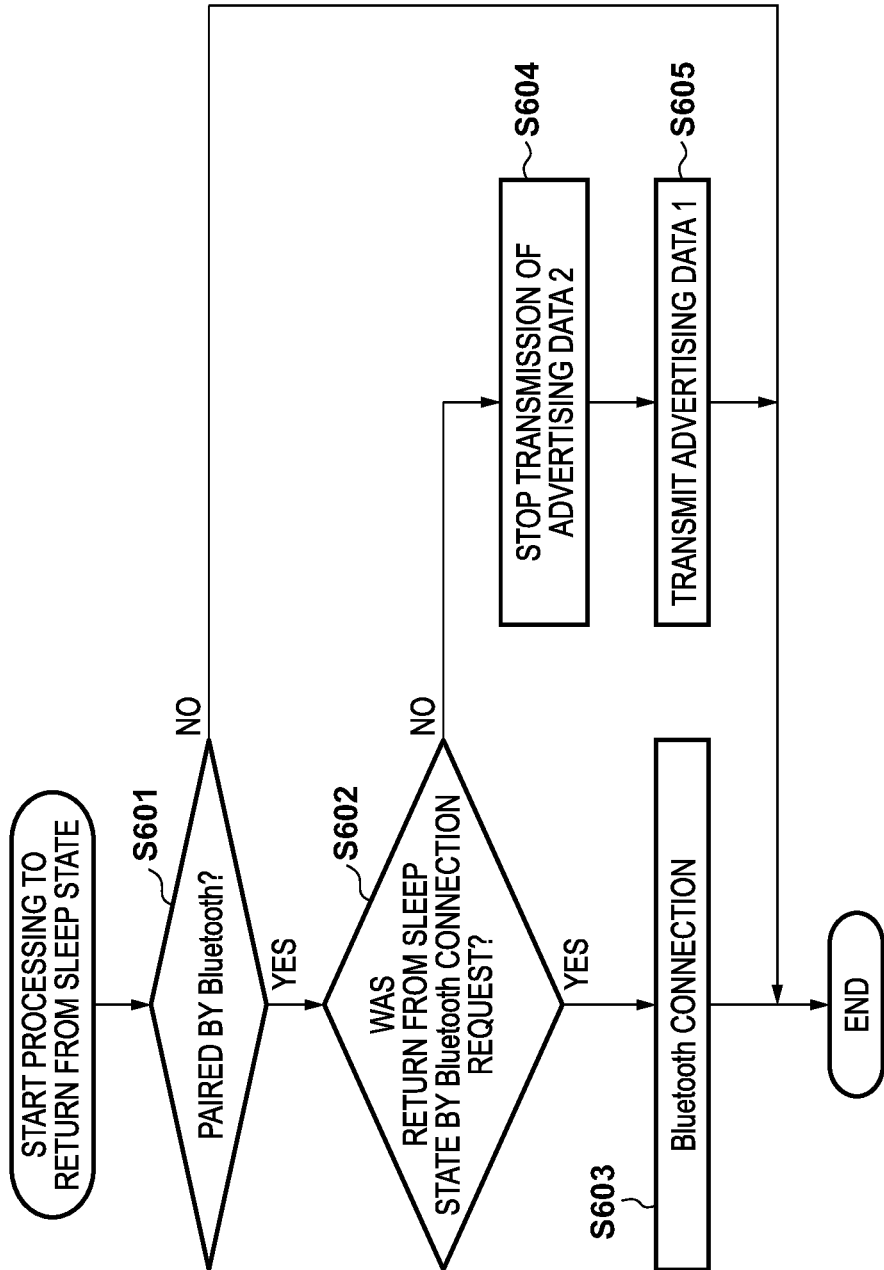
FIG. 6A is a flowchart illustrating a procedure when the digital camera returns from the sleep state according to the first embodiment.

FIG. 6A is a flowchart illustrating processing of returning from the sleep state by the digital camera 100. If the digital camera 100 transits to the sleep state while the power switch of the digital camera 100 is ON (in the auto power-off state), the digital camera 100 returns from the sleep state in response to an operation of the release switch or playback button of the operation unit 105. If the digital camera 100 has been set in the sleep state by turning off the power switch of the digital camera 100, the digital camera 100 returns from the sleep state by turning on the power switch of the operation unit 105.

In step S601, when the digital camera 100 returns from the sleep state, the control unit 101 confirms whether the digital camera 100 has been paired with the smartphone 200. If it is determined that the digital camera 100 has been paired with the smartphone 200 (YES in step S601), the control unit 101 confirms in step S602 whether the digital camera 100 returns from the sleep state by a Bluetooth connection request from the smartphone 200. That is, it is determined whether the cause of returning from the sleep state is a Bluetooth connection request from the smartphone 200. If the control unit 101 confirms that the digital camera 100 returns from the sleep state by the Bluetooth connection request from the smartphone 200 (YES in step S602), the control unit 101 performs, in step S603, Bluetooth connection processing to the smartphone 200. The processing of returning from the sleep state by the Bluetooth connection request from the smartphone 200 corresponds to steps S511, S512, and S513 of FIG. 5.

On the other hand, if the control unit 101 determines that the digital camera 100 returns from the sleep state by a cause other than the Bluetooth connection request from the smartphone 200 (NO in step S602), the process advances to step S604. In step S604, the control unit 101 stops transmitting the advertising data 2 including the information indicating that Bluetooth connection is restricted. In step S605, the control unit 101 transmits the advertising data 1 including the information indicating that Bluetooth connection is not restricted. The processing in which the digital camera 100 returns from the sleep state by a cause other than the Bluetooth connection request from the smartphone 200 corresponds to steps S501 and S502 of FIG. 5.

If the control unit 101 determines in step S601 that the digital camera 100 has not been paired with the smartphone 200, the process ends directly. In this case, since the control unit 101 performs no Bluetooth connection to the smartphone 200, no advertising packet is output in the sleep state, and thus nothing is done even after returning from the sleep state.

<Operation of Transiting to Sleep State by Digital Camera>

Figure 6B:
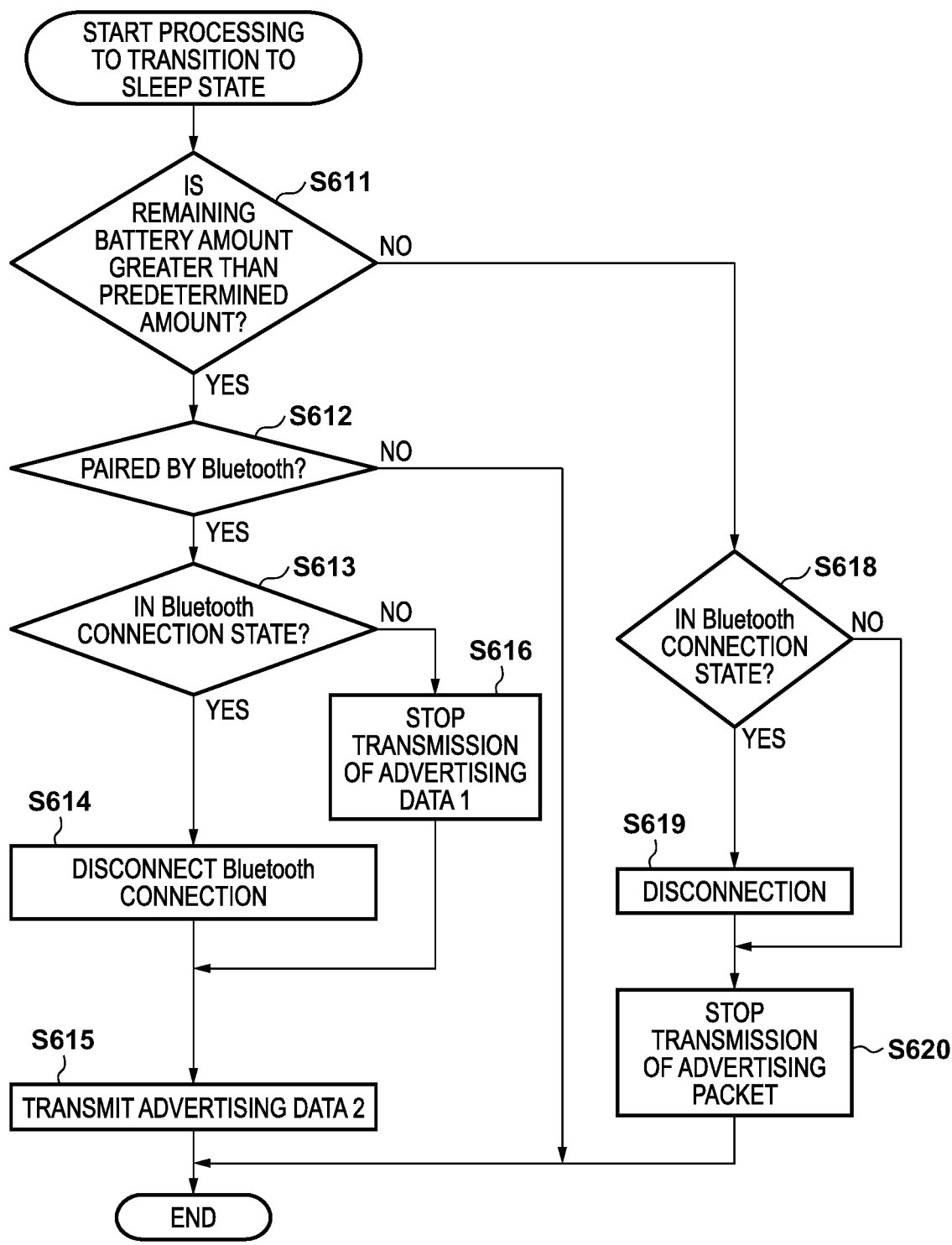
FIG. 6B is a flowchart illustrating a procedure when the digital camera enters the sleep state according to the first embodiment.

FIG. 6B is a flowchart illustrating an operation in which the digital camera 100 transits to the sleep state. There are two cases in which the digital camera 100 transits to the sleep state. That is, there are a case in which the digital camera 100 transits to the sleep state by the auto power-off function of automatically turning off the power when the digital camera 100 is left in the non-operation state while the power switch is ON, and a case in which the digital camera 100 transits to the sleep state by turning off the power switch of the operation unit 105. In either case, processing shown in FIG. 6B is activated to perform transition to the sleep state.

In step S611, when the digital camera 100 enters the sleep state, the control unit 101 confirms whether the remaining battery amount is larger than a predetermined amount. If the control unit 101 determines that the remaining battery amount is larger than the predetermined amount (YES in step S611), the control unit 101 confirms in step S612 whether the digital camera 100 has been paired with the smartphone 200 by Bluetooth. If the control unit 101 determines that the digital camera 100 has been paired with the smartphone 200 by Bluetooth (YES in step S612), the control unit 101 confirms in step S613 whether the digital camera 100 is in a Bluetooth connection state with respect to the smartphone 200.

If the control unit 101 determines that the digital camera 100 is in the Bluetooth connection state (YES in step S613), the control unit 101 disconnects the Bluetooth connection in step S614. In step S615, the control unit 101 transmits the advertising data 2. The processing in which when the digital camera 100 disconnects the Bluetooth connection in the Bluetooth connection state with respect to the smartphone 200, and transmits the advertising data 2 to the smartphone 200 to enter the sleep state corresponds to steps S506, S507, and S508 of FIG. 5.

If the control unit 101 determines in step S613 that the digital camera 100 is not in the Bluetooth connection state, the control unit 101 stops, in step S616, transmitting the advertising data 1 including the information indicating that Bluetooth connection is not restricted. In step S615, the control unit 101 transmits the advertising data 2 including the information indicating that Bluetooth connection is restricted. The state in which the digital camera 100 has been paired with the smartphone 200 (YES in step S612) and is not in the Bluetooth connection state (NO in step S613) includes the following cases, for example. That is, there are a case in which the power of the smartphone 200 is OFF, a case in which the Bluetooth function of the smartphone 200 is inactive, and a case in which no Bluetooth communication can be performed since the digital camera 100 and the smartphone 200 are far from each other.

If it is confirmed in step S612 that the digital camera 100 has not been paired with the smartphone 200, the digital camera 100 performs no Bluetooth connection to the smartphone 200, and thus the processing shown in FIG. 6B ends directly.

If the control unit 101 determines in step S611 that the remaining battery amount is equal to or smaller than the predetermined amount, the control unit 101 confirms in step S618 whether the digital camera 100 is in the Bluetooth connection state with respect to the smartphone 200. If the control unit 101 determines that the digital camera 100 is in the Bluetooth connection state (YES in step S618), the control unit 101 disconnects the Bluetooth connection in step S619. In step S620, the control unit 101 stops transmitting the advertising packet. On the other hand, if the control unit 101 determines in step S618 that the digital camera 100 is not in the Bluetooth connection state with respect to the smartphone 200, the control unit 101 stops, in step S620, transmitting the advertising packet.

If the remaining battery amount is equal to or smaller than the predetermined amount, the digital camera 100 cannot execute a shooting operation even if the operation unit 105 is operated, and cannot display shot image data on the display unit 106. Therefore, even if the smartphone 200 is operated to return the digital camera 100 from the sleep state, nothing can be done, resulting in wasteful power consumption. As in the above-described processing, if the remaining battery amount is equal to or smaller than the predetermined amount, the digital camera 100 performs no Bluetooth communication with the smartphone 200 in the sleep state.

<Flowchart at Start of Menu Display and Function of Smartphone>

The processing on the side of the smartphone 200 will be described next with reference to flowcharts shown in FIGS. 7A and 7B.

Figure 7A:
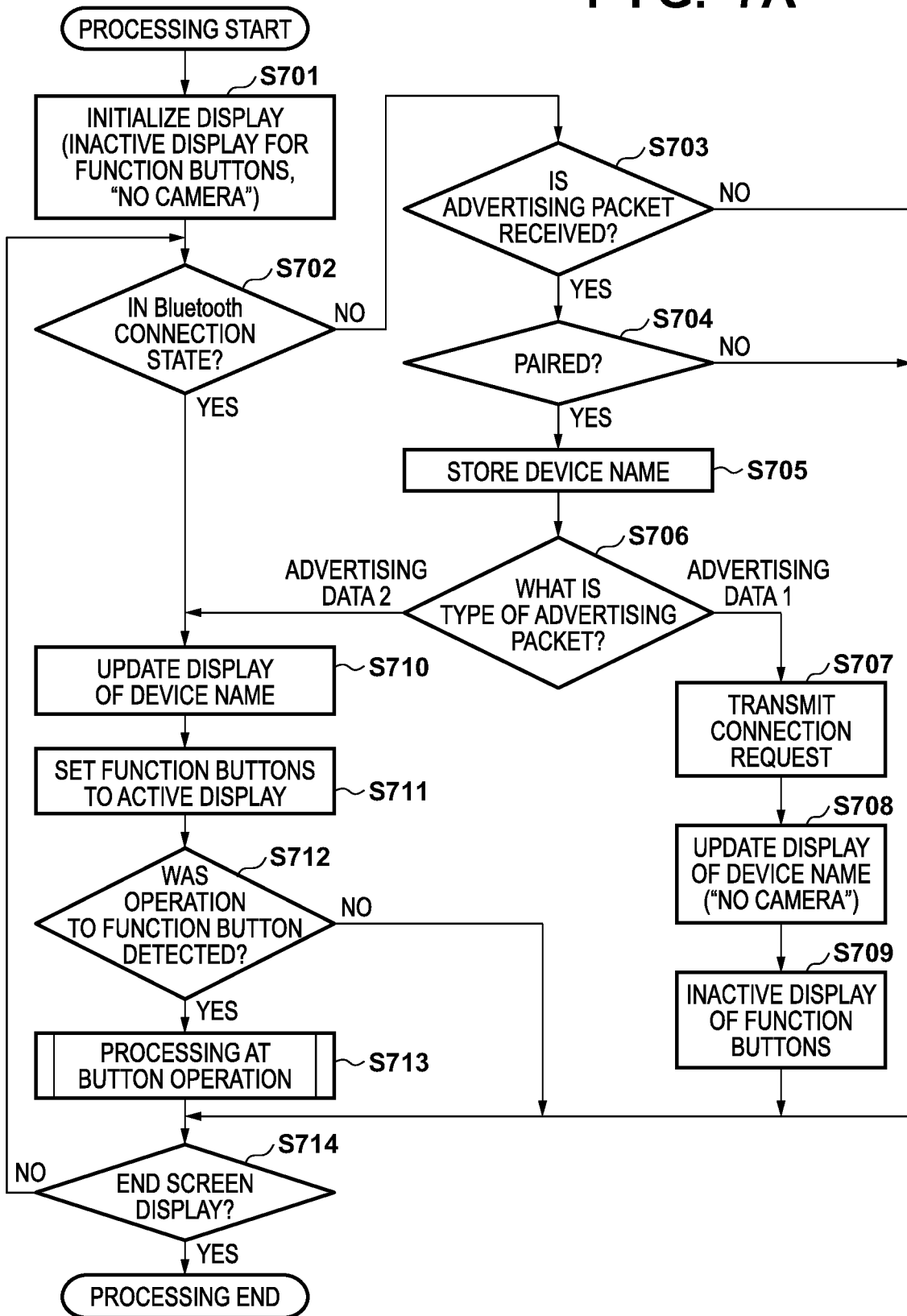
FIG. 7A is a flowchart illustrating the procedure of display processing and processing according to a user operation in the smartphone according to the first embodiment.
Figure 7B:
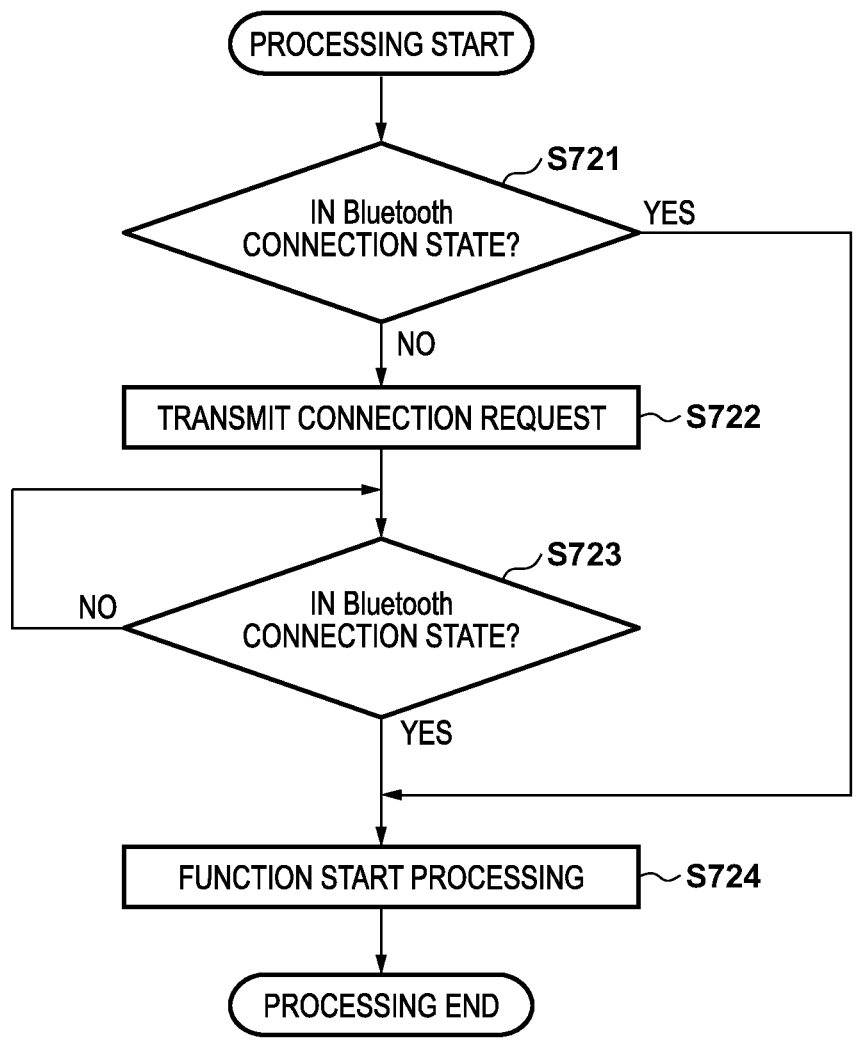
FIG. 7B is a flowchart illustrating the procedure of processing when starting a function in the smartphone according to the first embodiment.

FIG. 7A is a flowchart illustrating processing of displaying a main screen by an application executed on the smartphone 200 and processing according to a user operation.

Note that an example of display of the main screen will be described later with reference to FIGS. 8A and 8B. When an application for communicating with the digital camera is activated in accordance with an operation for the operation unit 205 in the smartphone 200, the control unit 201 starts the processing shown in FIG. 7A.

In step S701, the control unit 201 initializes the main screen displayed on the display unit 206. More specifically, the control unit 201 displays function buttons in an inactive state, and displays "no camera" in a display region for displaying a usable camera name. In step S702, the control unit 201 confirms whether the smartphone 200 and the digital camera 100 are in the Bluetooth connection state. If the control unit 201 determines that the smartphone 200 and the digital camera 100 are not Bluetooth-connected (NO in step S702), the process advances to step S703; otherwise (YES in step S702), the process advances to step S710.

In step S703, the control unit 201 confirms whether the advertising packet originated from the digital camera 100 has been received. If the control unit 201 determines that the advertising packet has been received (YES in step S703), the process advances to step S704; otherwise (NO in step S703), the process advances to step S714.

In step S704, the control unit 201 confirms whether the transmission source of the advertising signal, that is, the discovered digital camera 100 has been paired. If the control unit 201 determines that the digital camera 100 has been paired (YES in step S704), the process advances to step S705; otherwise (NO in step S704), the process advances to step S714. In this embodiment, the control unit 201 confirms whether the smartphone 200 has been paired with the digital camera 100 by determining whether a BLE encryption key which is shared with the digital camera 100 as a common encryption key at the time of pairing has been saved. A method of determining whether pairing has been performed is not limited to this.

In step S705, the control unit 201 stores the device name included in the advertising packet received as information of the connected camera. Next, in step S706, the control unit 201 confirms the contents of the received advertising packet (in this example, whether the received advertising packet is the advertising data 1 or 2). If the control unit 201 determines that the advertising packet is the advertising data 1, the process advances to step S707. If the control unit 201 determines that the advertising packet is the advertising data 2, the process advances to step S710.

In step S707, the control unit 201 sends a Bluetooth connection request to the digital camera 100. This is processing corresponding to step S504 of FIG. 5. Subsequently, in step S708, the control unit 201 displays "no camera" as display of a usable digital camera name on the main screen of the display unit 206. In step S709, the control unit 201 displays the function buttons of the main screen in the inactive state.

As described above, the smartphone 200 receives a notification (advertising packet) for short-range wireless communication (BLE), which is transmitted by the digital camera 100 as an external communication apparatus. The smartphone 200 determines whether the received notification is the advertising data 2 including the restriction information indicating that the timing of executing connection processing in short-range wireless communication is restricted or the advertising data 1 including no restriction information (step S703). If the advertising data 1 including no restriction information is received, the smartphone 200 transmits a connection request for connection processing at the first timing (in this example, immediately after reception of the advertising data 1), and performs the connection processing (step S707).

On the other hand, in step S710, the control unit 201 confirms the stored device name, and displays it on the display unit 206. The information of the digital camera used in step S710 is held in step S705 before the control unit 201 establishes Bluetooth connection between the digital camera 100 and the smartphone 200. Thus, if the advertising data 2 (the notification including the restriction information) is received, even if the smartphone 200 as an external apparatus of the transmission source of the notification is in a state in which short-range wireless communication is disconnected, the smartphone 200 is handled as if it were a currently connected external apparatus, and displayed.

In step S711, the control unit 201 displays the function buttons in an active state on the display unit 206. In step S712, the control unit 201 confirms whether an operation for the function button is detected. If the control unit 201 detects the operation for the function button, the control unit 201 performs, in step S713, processing at the time of the operation of the function button. Details of the processing at the time of the operation of the function button will be described later with reference to FIG. 7B. On the other hand, if the control unit 201 determines in step S712 that no operation for the function button is detected, the process advances to step S714.

In step S714, the control unit 201 confirms whether to end the display of the main screen. If the operation unit 205 of the smartphone 200 accepts an application end request or the remote control function starts in the processing in step S713, the control unit 201 determines to end the display of the main screen. If the control unit 201 determines to end the main screen, the processing shown in FIG. 7A ends; otherwise, the process returns to step S702, and the control unit 201 repeats the above-described processing.

The processing (the processing in step S713) executed by the control unit 201 when detecting the operation for the function button will be described next with reference to FIG. 7B. FIG. 7B is a flowchart illustrating processing executed when the control unit 201 of the smartphone 200 detects the operation for the function button.

In step S721, the control unit 201 confirms whether the smartphone 200 and the digital camera 100 are in the Bluetooth connection state. If the control unit 201 determines that the smartphone 200 and the digital camera 100 are not in the Bluetooth connection state (NO in step S721), the process advances to step S722; otherwise (YES in step S721), the process advances to step S724.

In step S722, the control unit 201 transmits a Bluetooth connection request to the digital camera 100. This is processing corresponding to step S511 of FIG. 5. In step S723, the control unit 201 stands by until Bluetooth connection between the digital camera 100 and the smartphone 200 is completed. After the control unit 201 sends the Bluetooth connection request in step S722, the digital camera 100 performs Bluetooth connection processing (corresponding to step S513 of FIG. 5), thereby performing Bluetooth connection. If the advertising data 2 including the restriction information is received, the smartphone 200 performs connection processing at a timing (in this example, in response to the operation for the function button of the smartphone 200 by the user) restricted as compared to a case in which the advertising data 1 is received.

Note that as described with reference to FIG. 5, in the state in which the digital camera 100 originates the advertising data 2 (that is, in the sleep state), Bluetooth connection starts in response to the Bluetooth connection request of the smartphone 200, thereby establishing connection. During a period from the Bluetooth connection request (step S511) by the smartphone 200 to establishment of Bluetooth connection, the digital camera 100 returns from the sleep state (step S512), and performs Bluetooth connection processing (step S513). Since the time may be taken to perform these processes, the control unit 201 may display a message or an icon indicating a standby state on the display unit 206 while the control unit 201 waits in step S723 until the Bluetooth connection state is set. This can reduce anxiety of the user when time is taken to perform the Bluetooth connection processing.

If the digital camera 100 and the smartphone 200 are set in the Bluetooth connection state, the control unit 201 starts, in step S724, the remote control function corresponding to the operated function button. For example, if the button of the shot image browsing function is operated, the control unit 201 requests the digital camera 100 to transmit images, and displays the received images on the display unit 206. The processing executed by the control unit 201 when the operation for the function button is detected has been described.

<Example of Display of Menu Screen of Smartphone>

FIGS. 8A and 8B each show an example of the menu screen displayed on the display unit 206 by the control unit 201 in the application operating on the smartphone 200 described above. Function buttons 802 and 803 as operation items for remote operations are provided. FIG. 8A shows an example of the menu screen when the function buttons 802 and 803 are displayed in the inactive state in the smartphone 200. On the other hand, FIG. 8B shows an example of the menu screen when the function buttons 802 and 803 are displayed in the active state.

Referring to FIGS. 8A and 8B, a device name display region 801 is used to display the device name of a remotely controllable digital camera. In steps S701, S708, and S710 of FIG. 7A, the control unit 201 updates the display in the device name display region 801. In a state in which the digital camera 100 and the smartphone 200 are not Bluetooth-connected and the digital camera 100 originates no advertising data 2, it is impossible to remotely control the digital camera 100 from the smartphone 200. Therefore, in the example of FIG. 8A, "no camera" is displayed in the device name display region 801. Note that this is merely an example, and the display is not limited to this. For example, if it is impossible to remotely control the digital camera 100, the control unit 201 may set the device name display region 801 in a non-display state.

On the other hand, in the example shown in FIG. 8B, "Camera A" is displayed as a device name in the device name display region 801. Note that in the first embodiment, the model name of the digital camera is displayed as a device name. However, the display contents are not limited to this. For example, a nickname arbitrarily settable in the digital camera by the user or the like may be displayed. Instead of characters, an icon representing the model of the digital camera or the like may be displayed.

The function button 802 for browsing display and the function button 803 for remote shooting are examples of a function control UI for remotely controlling the digital camera 100. In FIG. 8A, each function button is displayed in the inactive state. This is an example of display performed in step S701 or S709 by the control unit 201. On the other hand, in FIG. 8B, each function button is displayed in the active state. This is an example of display performed in step S711 by the control unit 201.

In this embodiment, in the Bluetooth connection state or at the time of reception of the advertising data 2, the control unit 201 displays the function buttons in the active state, as shown in FIG. 8B. Thus, even if the digital camera 100 is in the sleep state, the smartphone 200 can indicate to the user that the functions are usable, by the same expression as that in the Bluetooth connection state. In this embodiment, when the function button is operated, the control unit 201 confirms the Bluetooth connection state. Only if the smartphone 200 is not Bluetooth-connected, the control unit 201 sends a Bluetooth connection request to the digital camera, and starts the function. Thus, the digital camera 100 and the smartphone 200 perform Bluetooth connection appropriately at the time of use of the function without increasing the user's operation load associated with Bluetooth connection. As a result, if the digital camera 100 is in the sleep state, only when an operation is performed on the opposite apparatus side (smartphone side) to require Bluetooth connection, Bluetooth connection is executed. Therefore, it is possible to reduce wasteful power consumption in the sleep state.

Note that in this embodiment, a Bluetooth connection request is sent to the digital camera 100 without activating the function button at the time of reception of the advertising data 1, and then the function buttons are displayed in the active state at the time of establishment of Bluetooth connection. However, the timing of switching the function display is not limited to this. For example, when the advertising data 1 is received, the function buttons may be displayed in the active state.

Second Embodiment

The first embodiment has explained the case in which the smartphone 200 exchanges data with one digital camera 100. On the other hand, there may be a case in which the smartphone 200 can communicate with a plurality of digital cameras. The second embodiment will describe processing in a smartphone 200 that supports a case in which it is possible to communicate with a plurality of digital cameras. Furthermore, the second embodiment assumes that the smartphone 200 also exchanges data with a digital camera which maintains Bluetooth communication even in the sleep state.

Note that many parts in the second embodiment are common to the first embodiment and a description thereof will be omitted. Parts unique to the second embodiment will mainly be described.

<Arrangement of System>

FIG. 9 is a view schematically showing an example of a communication system according to this embodiment. As shown in FIG. 9, the communication system includes a plurality of digital cameras 100a, 100b, and 100c and the smartphone 200. The smartphone 200 can communicate with each digital camera by short-range wireless communication using Bluetooth. The digital camera 100a is a digital camera of a type that maintains Bluetooth connection even in the sleep state. Since Bluetooth connection is not restricted regardless of whether the digital camera 100a is in the sleep state, an advertising packet to be originated is not switched between the sleep state and returning from the sleep state. On the other hand, similarly to the digital camera 100 according to the first embodiment, each of the digital cameras 100b and 100c switches an advertising packet in accordance with whether the digital camera is in the sleep state, and originates it without maintaining Bluetooth connection in the sleep state.

<Example (Advertising Data 0) of Advertising Packet>

FIG. 10 shows an example of an advertising packet originated from the digital camera according to the second embodiment. The advertising packet shown in FIG. 10 includes no restriction information unlike the advertising packet (advertising data 1 or 2) shown in FIG. 4. This advertising packet is set as the advertising data 0.

The advertising data 0 is an advertising packet originated from the digital camera 100a that can perform Bluetooth connection even in the sleep state. For the digital camera 100a that originates the advertising data 0, whether Bluetooth connection is restricted remains the same regardless of whether the digital camera 100a is in the sleep state. Therefore, the digital camera 100a always originates the advertising data 0 to respond to a connection request. Processing executed by the digital camera 100b or 100c is as described in the first embodiment (FIGS. 6A and 6B). However, the advertising packet is not switched for the digital camera 100a, as described above.

<Flowchart at Start of Menu Display and Function of Smartphone 200>

Figure 11A:
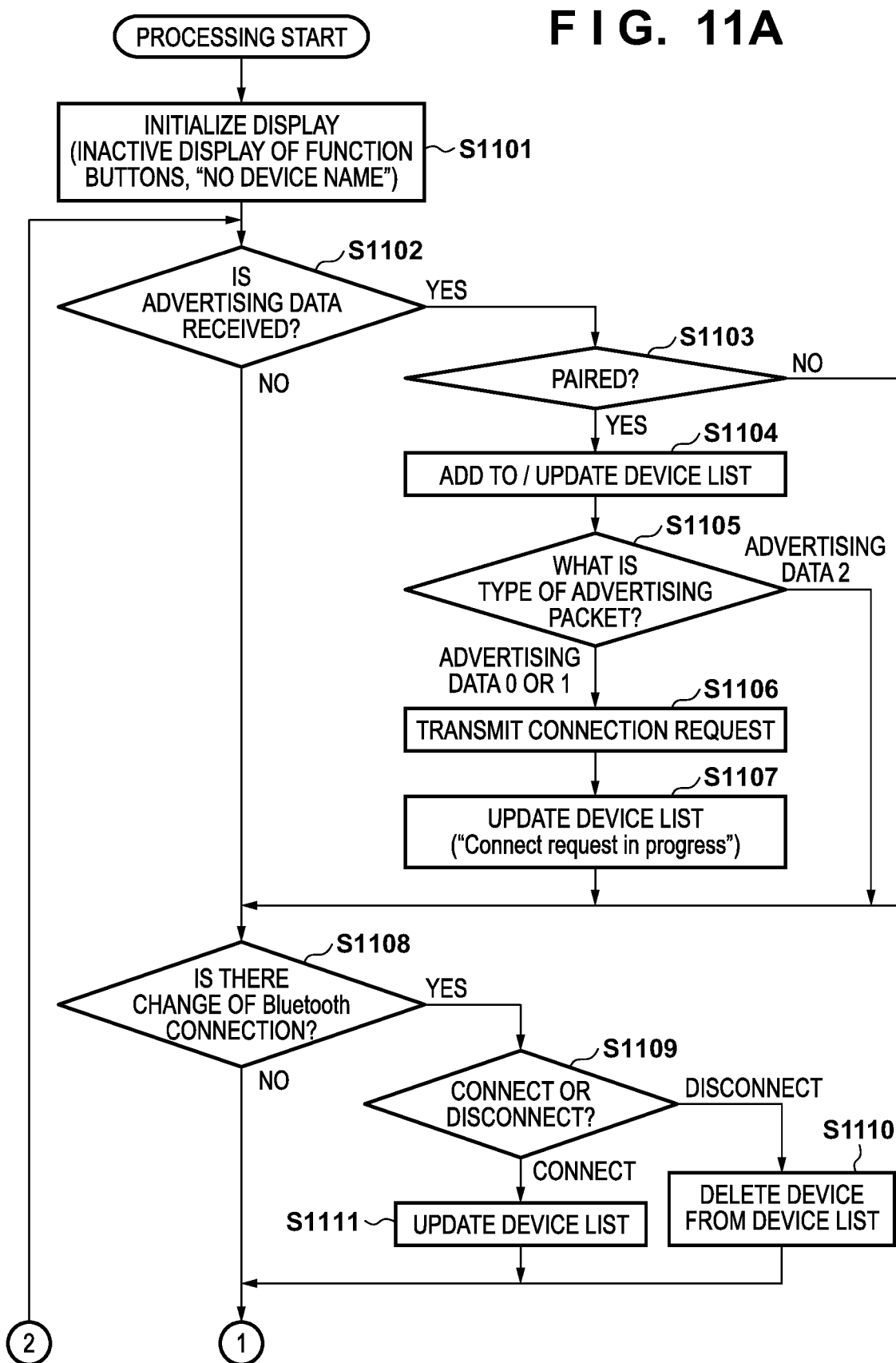
FIG. 11A is a flowchart illustrating the procedure of display processing and processing according to a user operation in the smartphone according to the second embodiment.
Figure 11B:
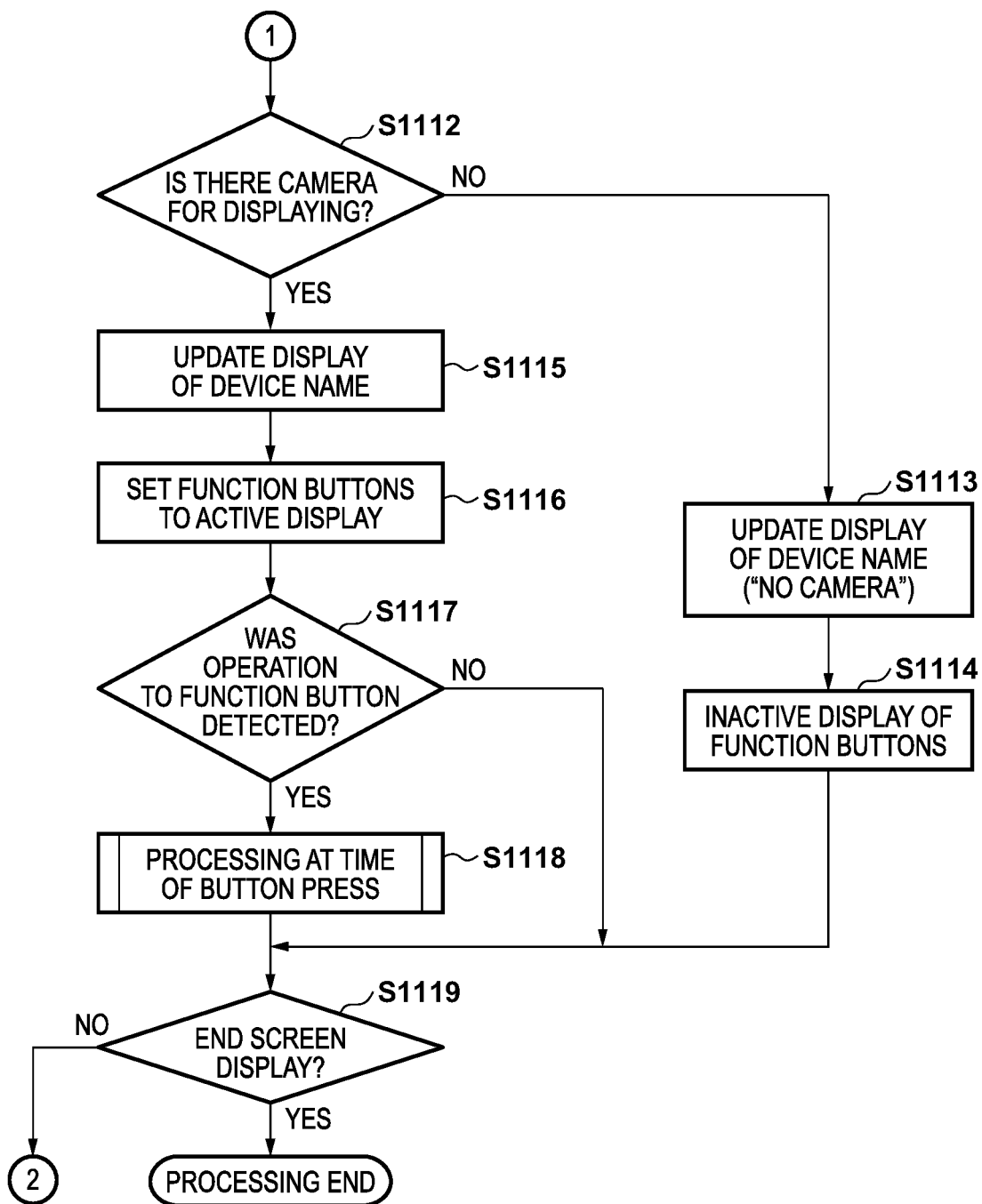
FIG. 11B is a flowchart illustrating the procedure of the display processing and the processing according to the user operation in the smartphone according to the second embodiment.

Processing executed by the smartphone 200 that can be Bluetooth-connected to the plurality of digital cameras will be described below. FIGS. 11A and 11B are flowcharts showing main screen display processing and processing according to a user operation in an application executed on the smartphone 200. Note that examples of display of a main screen are the same as in the first embodiment (FIGS. 8A and 8B). If an application activate request is accepted by the operation unit 205 of the smartphone 200, a control unit 201 starts the processing shown in FIGS. 11A and 11B.

In step S1101, the control unit 201 initializes the main screen displayed on a display unit 206. More specifically, the control unit 201 displays function buttons in the inactive state, and displays "no camera" in a device name display region 801 where a usable camera name is displayed. In step S1102, the control unit 201 confirms whether an advertising packet has been received from the digital camera 100. If the control unit 201 determines that an advertising packet has been received (YES in step S1102), the process advances to step S1103; otherwise (NO in step S1102), the process advances to step S1108.

In step S1103, the control unit 201 confirms whether the transmission source of the advertising signal, that is, the discovered digital camera 100 is a paired device. If the control unit 201 determines that the digital camera 100 is a paired device (YES in step S1103), the process advances to step S1104; otherwise (NO in step S1103), the process advances to step S1108.

In step S1104, the control unit 201 adds/updates a device list based on the contents of the advertising packet. The device list stores necessary information for each digital camera during the operation of the application to manage connection to the digital camera by the control unit 201. FIG. 11D shows an example of the data structure of the device list. The device list stores, for each digital camera, a device name 1151, a communication state 1152 of the device, and presence/absence 1153 of display in the application.

The device name 1151 indicates the name of the digital camera. The communication state 1152 of the device indicates whether the device is currently Bluetooth-connected to the digital camera, whether a connection request from the smartphone 200 is in progress, or the state of the originated advertising packet. The presence/absence 1153 of display in the application indicates whether the device is displayed on the application. The presence/absence of display in the application depends on the communication state of the device, and a device which is currently Bluetooth-connected or currently originates the advertising data 2 is displayed on the application (that is, similarly to the first embodiment).

Note that the smartphone 200 deletes, from the device list, a digital camera which is not Bluetooth-connected and for which no advertising packet is detected for a predetermined period. This is to detect elimination of a digital camera. Note that a method of detecting elimination is not limited to this. For example, the device list may be reset once by providing a reset button and operating the button.

Referring back to FIG. 11A, in step S1105, the control unit 201 confirms the contents of the received advertising packet. If the control unit 201 determines that the advertising packet is the advertising data 0 or 1, the control unit 201 sends, in step S1106, a Bluetooth connection request to the digital camera 100 which has originated the advertising packet. In step S1107, the control unit 101 updates the communication state 1152 of the device in the device list to "connection request in progress". On the other hand, if the control unit 201 determines in step S1105 that the advertising packet is the advertising data 2, the process advances to step S1108 without sending a Bluetooth connection request.

In step S1108, the control unit 201 confirms whether the state of the Bluetooth connection has changed (that is, whether Bluetooth connection to the digital camera has newly been established or Bluetooth connection has been disconnected). If the control unit 201 determines that the state of the connection has changed (YES in step S1108), the process advances to step S1109; otherwise, the process advances to step S1112.

In step S1109, the control unit 201 confirms whether the change in state of the Bluetooth connection is disconnection or connection. If the control unit 201 determines that "disconnection" of Bluetooth has been done, the control unit 201 deletes, in step S1110, the information of the device from the device list. On the other hand, if the control unit 201 determines in step S1109 that "connection" of Bluetooth has been done, the control unit 201 updates, in step S1111, the communication state 1152 of the device in the device list to "currently Bluetooth-connected".

In step S1112, the control unit 201 confirms the device list, and determines whether there is a digital camera to be displayed. If there is at least one digital camera whose presence/absence 1153 of display is "display" in the device list, the control unit 201 determines that there is a digital camera to be displayed. If the control unit 201 determines that there is no digital camera to be displayed (NO in step S1112), the process advances to step S1113; otherwise (YES in step S1112), the process advances to step S1115.

In step S1113, the control unit 201 updates, to "no camera", the display of the device name display region 801, on the display unit 206, for displaying the usable digital camera name. In step S1114, the control unit 201 displays the function buttons in the inactive state. After that, the process advances to step S1119.

In step S1115, the control unit 201 updates the display of the device name in the device name display region 801. At this time, if there are a plurality of digital cameras whose presence/absence 1153 of display of the device list is "display", the control unit 201 displays "camera: plural". Note that this is merely an example of display to indicate that a plurality of digital cameras are usable. The present invention is not limited to this. For example, all the device names of the plurality of digital cameras may be arranged and displayed. Subsequently, in step S1116, the control unit 201 displays the function buttons in the active state.

In step S1117, the control unit 201 confirms whether an operation for the function button is detected. If the control unit 201 determines that an operation for the function button is detected (YES in step S1117), the control unit 201 performs, in step S1118, processing at the time of the operation of the function button. Note that the processing at the time of the operation of the function button will be described later with reference to FIG. 11C. On the other hand, if the control unit 201 determines that no operation for the function button has been detected (NO in step S1117), the process advances to step S1119.

In step S1119, the control unit 201 confirms whether to end the display of the main screen. If an application end request is accepted by the operation unit 205 of the smartphone 200, or the remote control function starts in the processing in step S1118, the control unit 201 determines to end the display of the main screen. If the control unit 201 determines to end the main screen (YES in step S1119), the processing shown in FIGS. 11A and 11B ends; otherwise (NO in step S1119), the process returns to step S1102 to repeat the above-described processing shown in FIGS. 11A and 11B.

Processing executed when the control unit 201 detects the operation for the function button will be described next with reference to FIG. 11C. This processing corresponds to the processing executed by the control unit 201 in step S1118.

In step S1121, the control unit 201 confirms the device list, and confirms whether there are two or more digital cameras to be displayed. Note that since it is confirmed in step S1112 that there are one or more cameras to be displayed, the device list includes at least one digital camera to be displayed.

If the control unit 201 determines that the number of digital cameras to be displayed is one (NO in step S1121), in step S1122 the control unit 201 sets, as a remote control target, the one digital camera to be displayed. Then, the process advances to step S1126.

On the other hand, if the control unit 201 determines that there are two or more digital cameras to be displayed (YES in step S1121), in step S1123 the control unit 201 displays, on the display unit 206, a list of the device names of the digital cameras to be displayed. At this time, the control unit 201 displays an arbitrary digital camera displayed on the display unit 206 to be selectable by the operation unit 205. In step S1124, the control unit 201 stands by until an arbitrary one of the digital cameras displayed in the list is selected by the operation unit 205. If selection of the digital camera is detected (YES in step S1124), the control unit 201 sets, in step S1125, the selected digital camera as a remote control target.

In step S1126, the control unit 201 confirms whether the smartphone 200 and the digital camera to be remotely controlled are in the Bluetooth connection state. If the control unit 201 determines that the smartphone 200 and the digital camera to be remotely controlled are not in the Bluetooth connection state (NO in step S1126), the process advances to step S1127; otherwise (YES in step S1126), the process advances to step S1129.

In step S1127, the control unit 201 transmits a Bluetooth connection request to the digital camera to be remotely controlled. This is processing corresponding to step S511 of FIG. 5. In step S1128, the control unit 201 stands by until the digital camera 100 and the smartphone 200 are Bluetooth-connected. After the control unit 201 sends the Bluetooth connection request in step S1127, the digital camera 100 performs Bluetooth connection processing (corresponding to step S513 of FIG. 5) to establish Bluetooth connection.

If the control unit 201 determines that the smartphone 200 and the digital camera to be remotely controlled are in the Bluetooth connection state (YES in step S1128), the process advances to step S1129. In step S1129, the control unit 201 starts the remote control function of executing the function corresponding to the operated function button. In the remote control function, for example, if the button of the shot image browsing function is operated, the control unit 201 requests the digital camera 100 to transmit images, and displays the received images on the display unit 206. The above processing is the processing executed by the control unit 201 when detecting the operation for the function button.

<Example of Display of Camera List on Smartphone>

Figure 11C:
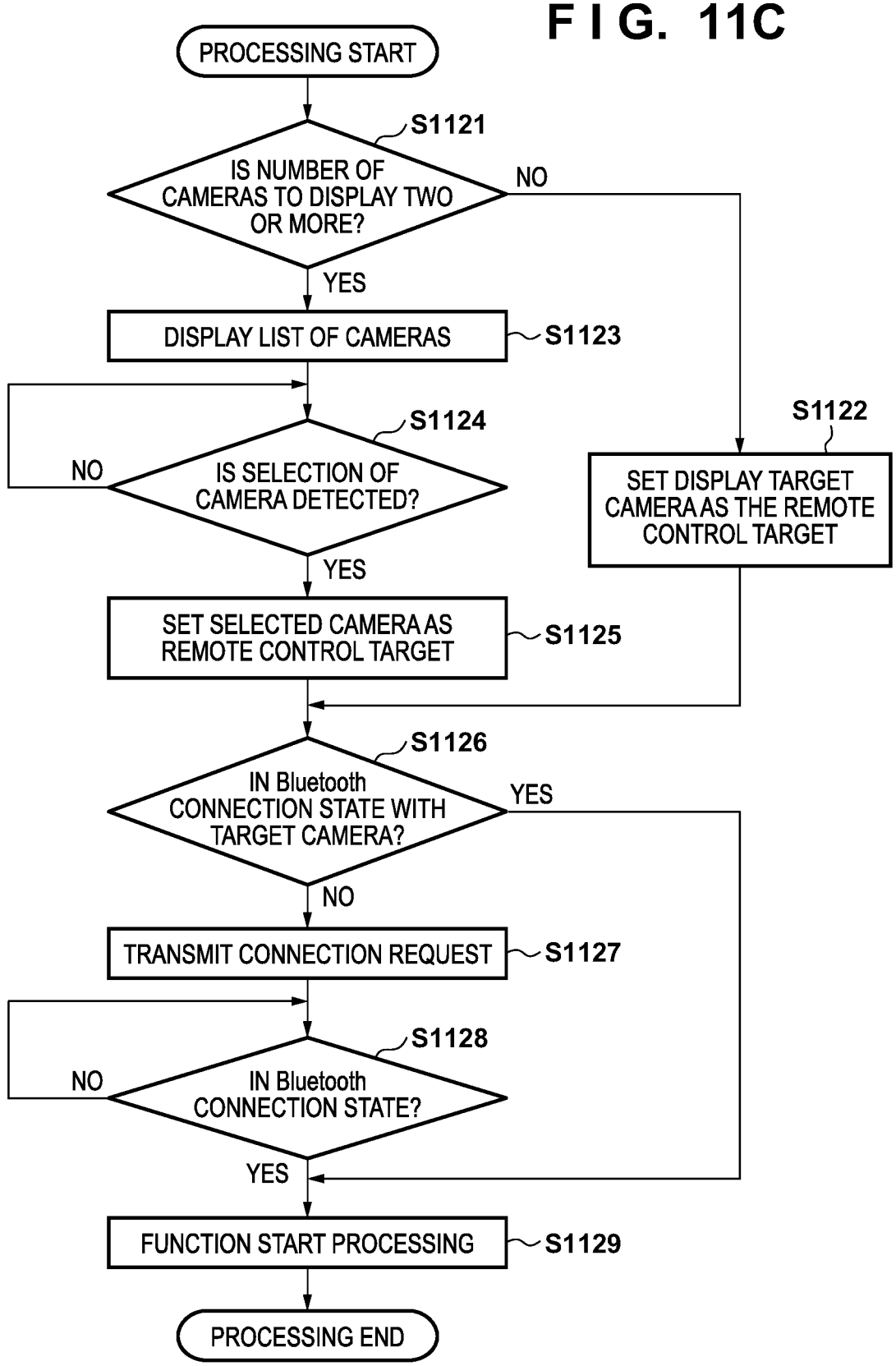
FIG. 11C is a flowchart illustrating the procedure of processing when starting a function in the smartphone according to the second embodiment.
Figure 12:
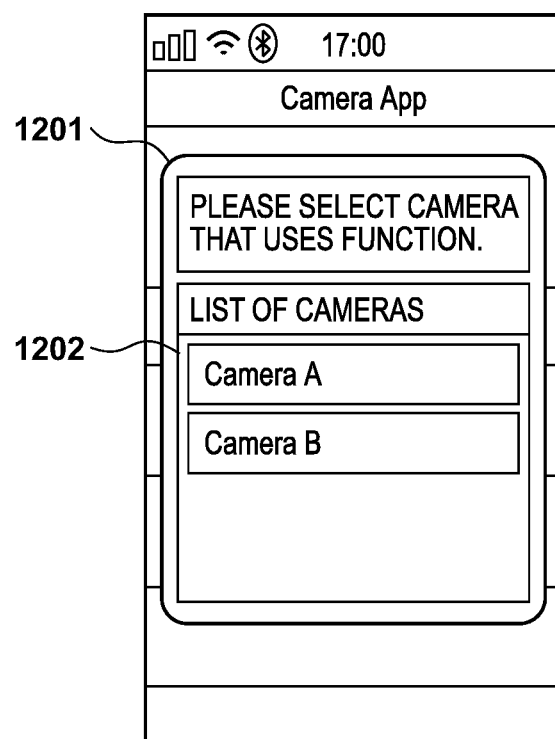
FIG. 12 is a view showing an example of list display of cameras on the smartphone according to the second embodiment.

FIG. 12 is a view showing an example of the list display of the digital cameras, which is displayed on the display unit 206 by the control unit 201 in step S1123 of FIG. 11C. If it is determined that a plurality of digital cameras to be displayed (that is, digital cameras usable for remote control) exist in the device list, the control unit 201 displays a selection dialog box 1201. When a list of the digital cameras is displayed in the selection dialog box 1201, the user can select the usable digital cameras. The control unit 201 displays, in a digital camera display region 1202, a list of the device names of the digital cameras to be displayed. Upon detecting that one of the digital cameras displayed in the digital camera display region 1202 is selected by the operation unit 205, the control unit 201 performs the processes in steps S1125 to S1129, as necessary. This allows the user to use the selected function.

As described above, in this embodiment, the control unit 201 holds, in the device list, a Bluetooth connection state with respect to the digital camera, and an advertising origination state. If, with reference to the device list, there are one or more digital cameras which are in the Bluetooth connection state or which originate the advertising data 2, the control unit 201 displays, in the active state, the function buttons for performing remote control. Thus, even if there are a plurality of digital cameras, the smartphone 200 can indicate to the user that the functions are usable, by the same expression regardless of whether digital camera is in the sleep state or the Bluetooth connection state. There may be a case in which a digital camera that can always perform Bluetooth connection (a digital camera that originates the advertising data 0) and a digital camera that restricts Bluetooth connection in the sleep state (a digital camera that switches between the advertising data 1 and 2) coexist. Even in the state in which these digital cameras coexist in the communication system, the smartphone 200 according to this embodiment can indicate the usable functions to the user by the same expression.

In this embodiment, if there are plurality of digital cameras for which remote control is usable, the control unit 201 displays a list of the device names on the display unit 206. If the user selects a digital camera to be used, the control unit 201 performs Bluetooth connection, as necessary. Thus, even the digital camera in the sleep state can perform Bluetooth connection appropriately only when the digital camera is selected as a remote control target and the function is used, without increasing the user's operation load associated with Bluetooth connection. As a result, in the sleep state, it is possible to prevent wasteful power consumption until the function is used.

Note that in this embodiment, if it is determined in step S1121 that only one digital camera is to be displayed, the control unit 201 does not display the selection dialog box 1201 and the digital camera is automatically set as a remote control target. However, even if the number of digital cameras to be displayed is one, Bluetooth connection and the function may be started after the selection dialog box is displayed and the user selects the displayed digital camera, similarly to the case in which there are the plurality of digital cameras to be displayed.

Third Embodiment

The first embodiment has explained the arrangement in which, for example, after the digital camera 100 is set in the auto power-off state (sleep state) by fixing it by a tripod or the like and it is left while the power switch is ON, the digital camera 100 can return from the sleep state by a user operating the smartphone 200, and perform shooting. At this time, if the digital camera 100 is left after the end of shooting, the power is automatically turned off again to enter the auto power-off state, thereby setting the sleep state. Independently of this, the power switch of the digital camera 100 may be turned off to set the sleep state. The third embodiment will describe returning from the sleep state in accordance with an operation for a smartphone 200 when a digital camera 100 transits to the sleep state by the OFF operation of a power switch.

In the above-described case, even if the digital camera 100 returns from the sleep state, execution of a shooting operation is impossible since the power switch is OFF. In addition, the digital camera 100 performs no display on a display unit 106. In this embodiment, in this situation, the smartphone 200 can cause the digital camera 100 to transmit shot images recorded in a recording medium 110, and display the images on a display unit 206. That is, although remote shooting of the digital camera 100 by the smartphone 200 is restricted, the shot images in the digital camera 100 can be remotely browsed. Since the digital camera 100 performs no display on the display unit 106, no power is consumed unnecessarily, and no shooting is performed even if an operation unit 105 is operated. Therefore, if an unintended operation is performed in a bag or the like, shooting or the like is never performed.

An operation of the digital camera 100 in the sleep state, which can be performed from the smartphone 200, is different in accordance with the state of the power switch. If the power switch is ON and the digital camera 100 is not in the sleep state, shooting and browsing by remote operations can be performed. If the power switch is ON and the digital camera 100 is in the auto power-off state, shooting and browsing by remote operations can be performed after returning from the sleep state. If the power switch is OFF, only browsing by a remote operation can be performed after returning from the sleep state.

<Examples of Advertising Packet>

Figure 13:
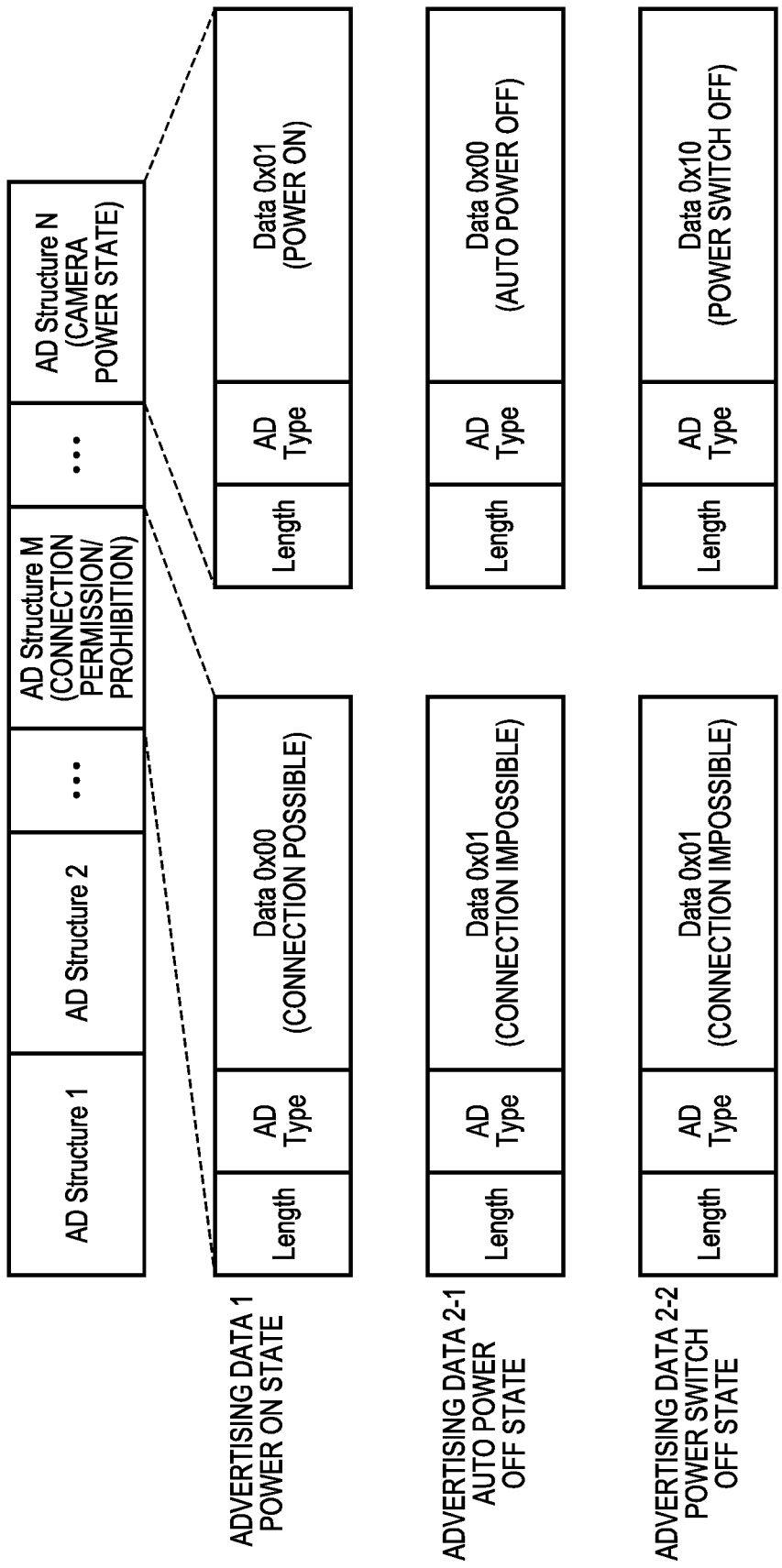
FIG. 13 is a view showing examples of an advertising packet of a digital camera according to the third embodiment.

FIG. 13 is a view showing examples of an advertising packet of the digital camera 100 according to this embodiment. Information of the power state of the digital camera 100 is added to the example of the advertising packet of FIG. 4, and a value is changed in accordance with the power state of the digital camera 100. The value according to the power state indicates a cause of occurrence of transition from the normal state as the first power mode to the sleep state as the power-saving second power mode. In this embodiment, examples of the cause are transition to the sleep state by the auto power-off function and transition to the sleep state by the OFF operation of the power switch.

An example of the advertising packet when the power switch of the digital camera 100 is ON, the digital camera 100 is not in the sleep state, and Bluetooth connection to the smartphone 200 is not restricted is represented by advertising data 1 shown in FIG. 13. The advertising data 1 shown in FIG. 13 is an advertising packet transmitted in the normal state, and information indicating the power state may be omitted. If the information indicating the power state is omitted, the advertising data 1 shown in FIG. 13 is the same as the advertising data 1 shown in FIG. 4.

Upon receiving the advertising data 1, the smartphone 200 knows that the digital camera 100 can perform Bluetooth connection and the power switch is ON. Therefore, the smartphone 200 transmits a Bluetooth connection request to the digital camera 100. If the digital camera 100 is not in the sleep state, the digital camera 100 can be Bluetooth-connected to the smartphone 200, and the remote shooting function and browsing function can be operated from the smartphone 200.

An example of the advertising packet when the digital camera 100 is in the sleep state, cannot perform Bluetooth connection to the smartphone 200, and is in the auto power-off state (the power switch is ON) is represented by advertising data 2-1 shown in FIG. 13. The advertising data 2-1 is obtained by including, in the advertising data 2 shown in FIG. 4, information (information indicating the auto power-off state) indicating that the cause of occurrence of transition from the normal state to the sleep state is the digital camera 100 being left for a period exceeding a predetermined time.

Upon receiving the advertising data 2-1, the smartphone 200 knows that "the timing of Bluetooth connection of the digital camera 100 should be restricted and the digital camera 100 is in the auto power-off state (the power switch is ON)". In this case, the smartphone 200 does not transmit a Bluetooth connection request to the digital camera 100 immediately. Thus, if the digital camera 100 is in the sleep state, the digital camera 100 and the smartphone 200 are not Bluetooth-connected. If a predetermined operation is performed in the smartphone 200, the smartphone 200 transmits a Bluetooth connection request to the digital camera 100. If the digital camera 100 is in the auto power-off state and the sleep state, Bluetooth connection can be performed in response to a predetermined operation in the smartphone 200, and the remote shooting function and browsing function can be operated by the smartphone 200.

An example of the advertising packet when the digital camera 100 is in the sleep state, and cannot perform Bluetooth connection to the smartphone 200, and the power switch is OFF is represented by advertising data 2-2 shown in FIG. 13. The advertising data 2-2 is obtained by including, in the advertising data 2 shown in FIG. 4, information (information indicating that the power switch is OFF) indicating that the cause of occurrence of transition from the normal state to the sleep state is the OFF operation of the power switch.

Upon receiving the advertising data 2-2, the smartphone 200 knows that "the timing of Bluetooth connection of the digital camera 100 should be restricted and the power switch is OFF". In this case, the smartphone 200 does not transmit a Bluetooth connection request to the digital camera 100 immediately. Thus, if the digital camera 100 is in the sleep state, the digital camera 100 and the smartphone 200 are not Bluetooth-connected. If an operation is performed in the smartphone 200, a Bluetooth connection request is transmitted to the digital camera 100. If the power switch of the digital camera 100 is OFF and the digital camera 100 is in the sleep state, when an operation is performed in the smartphone 200, Bluetooth connection can be performed. However, since the power switch of the digital camera 100 is OFF, the remote shooting function is restricted and is not activated, and the browsing function can be operated.

<Flowchart at Time of Entering Sleep State by Digital Camera>

Figure 14:
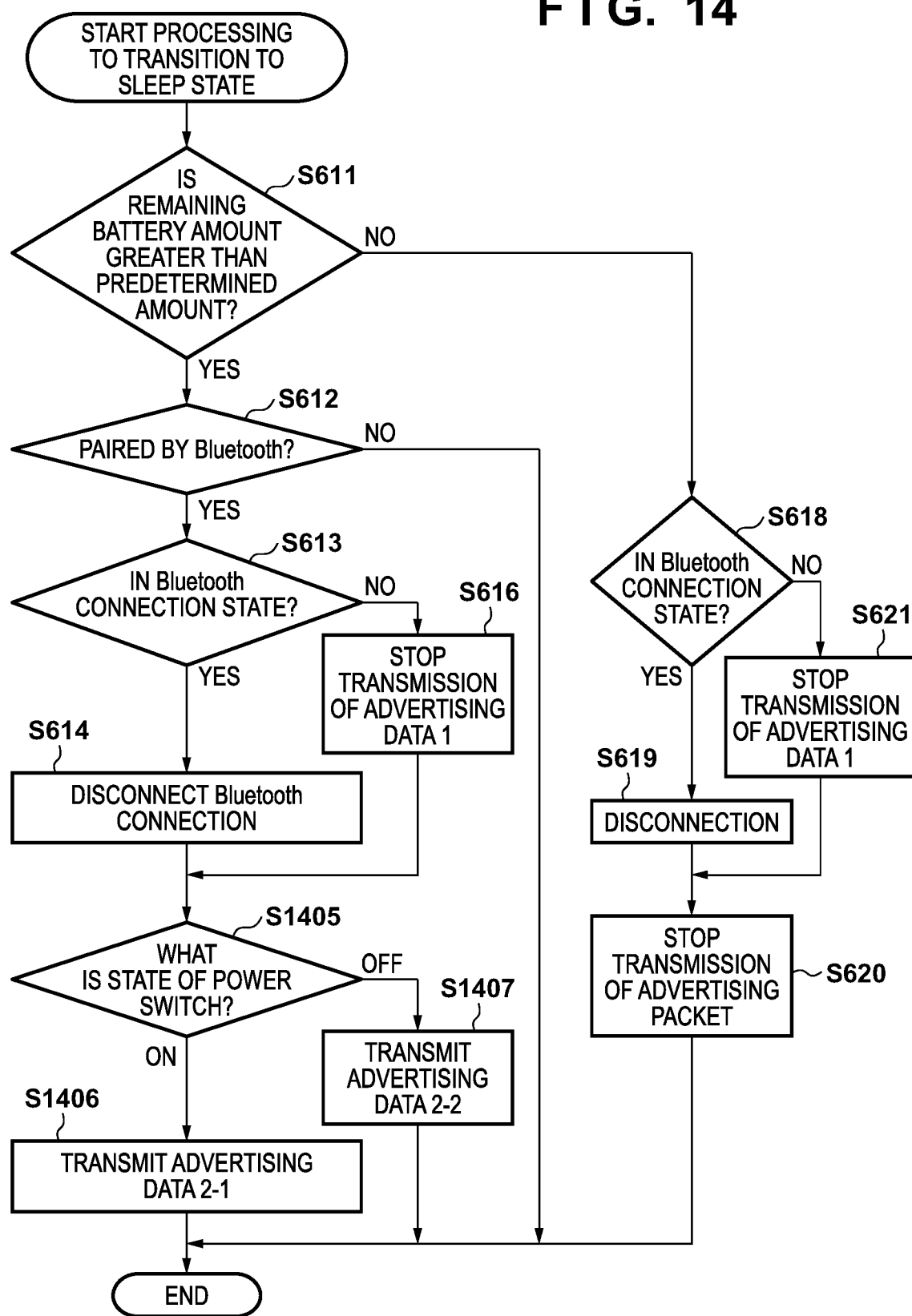
FIG. 14 is a flowchart illustrating a procedure when the digital camera enters the sleep state according to the third embodiment.

FIG. 14 is a flowchart illustrating an operation when the digital camera 100 transits to the sleep state according to the third embodiment. There are two cases in which the digital camera 100 transits to the sleep state. In one case, the digital camera enters the sleep state by the auto power-off function of automatically turning off the power when the non-operation state continues for a period exceeding a predetermined time (the digital camera 100 is continuously left for the predetermined time) while the power switch is ON. In the other case, the digital camera enters the sleep state by operating the operation unit 105 to turn off the power switch. Note that in FIG. 14, the same step numbers as those in FIG. 6B denote the same processes. Steps S1405, S1406, and S1407 are mainly different from the processes shown in FIG. 6B.

A control unit 101 of the digital camera 100 disconnects the Bluetooth connection (step S614) or stops transmitting the advertising data 1, in accordance with whether the digital camera 100 and the smartphone 200 are in the Bluetooth connection state. After the processing in step S614 or S616, the control unit 101 confirms the state of the power switch in step S1405. If the control unit 101 determines in step S1405 that the power switch is ON, the control unit 101 transmits the advertising data 2-1 in step S1406. If the control unit 101 determines in step S1405 that the power switch is OFF, the control unit 101 transmits the advertising data 2-2 in step S1407.

<Flowchart at Start of Menu Display and Function of Smartphone>

Processing on the side of the smartphone 200 will be described next with reference to FIGS. 15A and 15B.

FIG. 15A is a flowchart illustrating main screen display processing and processing according to a user operation in a camera control application executed on the smartphone 200. If an application activate request is accepted by the operation unit 205 of the smartphone 200, a control unit 201 starts the processing shown in FIG. 15A. In FIG. 15A, the same step numbers as those in FIG. 7A denote the same processes. Steps S1505, S1506, and S1513 are mainly different from FIG. 7A, and will be described below.

If the control unit 201 determines in step S704 that the smartphone 200 and the digital camera 100 have been paired, the process advances to step S1505. In step S1505, the control unit 201 stores the device name and the state of the advertising packet included in the advertising packet. Storage of the state of the advertising packet indicates storage of information indicating whether the advertising packet is the advertising data 1, 2-1, or 2-2.

In step S1506, the control unit 201 confirms the contents of the received advertising packet. If the control unit 201 determines that the advertising packet is the advertising data 1, the process advances to step S707. If the control unit 201 determines that the advertising packet is the advertising data 2-1 or 2-2, the process advances to step S710.

If the control unit 201 determines that an operation for the function button is detected (YES in step S712), the control unit 201 performs, in step S1513, processing at the time of the operation of the function button. If the advertising data 2-1 has been received, the control unit 201 can perform the remote shooting function and browsing function of the digital camera 100. If the advertising data 2-2 has been received, the remote shooting function cannot be performed, and the browsing function can be performed. The processing executed when the control unit 201 detects the operation for the function button (YES in step S712) will be described below with reference to FIG. 15B. This corresponds to the processing executed by the control unit 201 in step S1513.

Figure 15B:
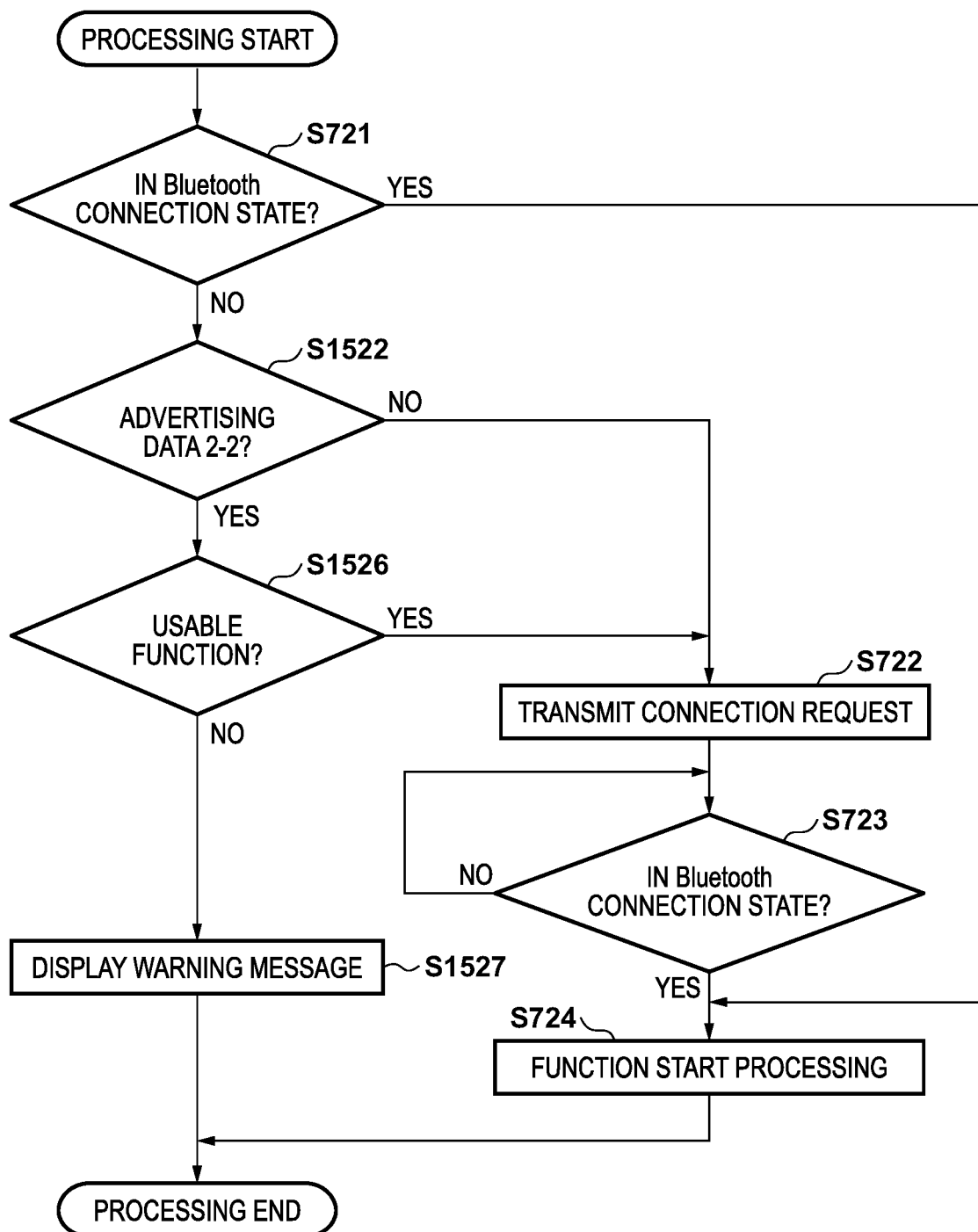
FIG. 15B is a flowchart illustrating the procedure of processing when starting a function in the smartphone according to the third embodiment.

FIG. 15B is a flowchart illustrating the processing executed by the control unit 201 of the smartphone 200 when an operation for the function button is detected. In FIG. 15B, the same step numbers as those in FIG. 7B denote the same processes. Processes (steps S1522, S1526, and S1527) different from FIG. 7B will mainly be described below.

In step S1522, the control unit 201 confirms the state of the advertising packet of the digital camera 100 stored in step S1505, and determines whether the stored advertising packet is the advertising data 2-2. If the control unit 201 determines that the advertising packet is the advertising data 2-2 (YES in step S1522), the process advances to step S1526; otherwise (NO in step S1522), the process advances to step S722.

In step S1526, the control unit 201 determines whether the function (that is, the function for which a start request is received) corresponding to the function button operated in step S712 is usable. More specifically, if the function button operated in step S712 is the button of the function of browsing images in the camera, even if the power switch of the digital camera 100 is OFF, the function is usable, and thus the control unit 201 determines that the function is usable. On the other hand, if the function button selected in step S712 is the button of the shooting function, the function is unusable when the power switch of the digital camera 100 is OFF, and thus the control unit 201 determines that the function is unusable. If the control unit 201 determines in step S1526 that the function is usable (YES in step S1526), the process advances to step S722; otherwise (NO in step S1526), the process advances to step S1527.

In step S1527, the control unit 201 displays, on the display unit 206, a warning message indicating that the function is unusable. The processing shown in FIG. 15B ends without performing Bluetooth connection request and function start processing. The above-described processing is executed by the control unit 201 when detecting an operation for the function button.

<Example of Message Display of Smartphone>

Figure 16:
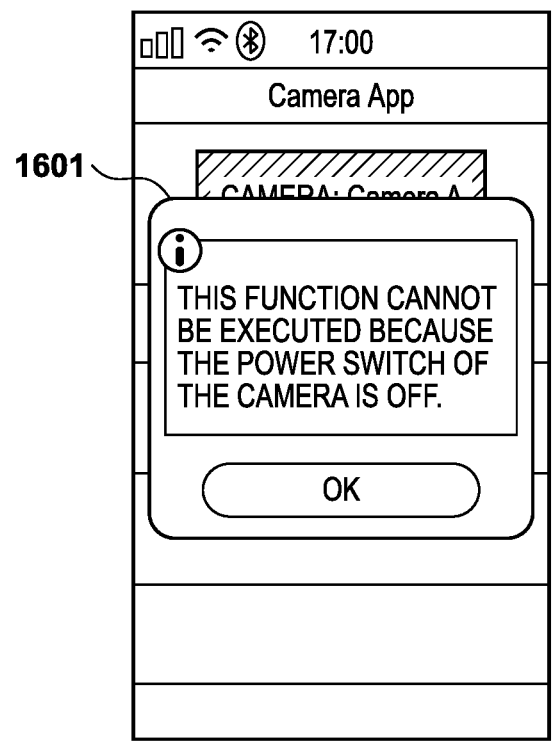
FIG. 16 is a view showing an example of display of a warning message on the smartphone according to the third embodiment.

FIG. 16 is a view showing an example of display of the warning message which is displayed on the display unit 206 by the control unit 201 in step S1527 of FIG. 15B. Referring to FIG. 16, the control unit 101 indicates, to the user, by a warning dialog box 1601, a state in which the function is unusable since the power switch is OFF.

As described above, in the third embodiment, the control unit 201 displays the function buttons in the active state, as shown in FIG. 8B, when the smartphone is in the Bluetooth connection state or when the advertising data 2 is received. Furthermore, when detecting an operation for the function button, the control unit 201 determines, based on the contents of the advertising packet received from the digital camera 100, whether the function is usable. Only if it is determined that the function is usable, the control unit 201 sends a Bluetooth connection request to the digital camera 100, as necessary, thereby starting the function. This allows the digital camera 100 and the smartphone 200 to perform Bluetooth connection appropriately in accordance with whether the function is usable, without increasing the user's operation load associated with Bluetooth connection. Therefore, it is possible to prevent wasteful power consumption in the sleep state. Since no Bluetooth connection request is sent when the function is unusable, an unnecessary waiting time of the user caused by Bluetooth connection can be eliminated.

Note that in the third embodiment, when receiving the advertising data 2-2 from the digital camera 100, the function button of the function unusable in the digital camera which has originated the advertising data 2-2 is displayed in the active state (step S711). When the operation of the function button of the unusable function is accepted from the user, a warning is displayed (step S1527), and no Bluetooth connection request is sent to the digital camera 100. A method in which when the unusable function is to be used on the smartphone 200, no Bluetooth connection request is sent to the digital camera 100 which has originated the advertising data 2-2 is not limited to this. For example, if the advertising data 2-2 is confirmed in step S1506, the control unit 201 may display the function button of the unusable function in the inactive state not to accept an operation from the user. If the advertising data 2-2 is confirmed in step S1506, the control unit 201 may not display the function button of the unusable function (the function button of the shooting function in this embodiment) or may display the function button in the inactive state.

Other Embodiments

The preferred embodiments of the present invention have been described above. However, the present invention is not limited to these embodiments, and various changes and modifications can be made within the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-243090, filed Dec. 19, 2017, which is hereby incorporated by reference herein in its entirety.

What is claimed is:

1. A communication system comprising a first communication apparatus and a second communication apparatus,
the first communication apparatus comprising:
at least one memory storing instructions; and
at least one processor configured to, upon executing the stored instructions, function as
a unit configured to transmit a first notification for connection processing in short-range wireless communication during an operation in a first power mode, and
a unit configured to transmit a second notification, different from the first notification, for the connection processing in the short-range wireless communication during an operation in a second power mode in which less power is used than in the first power mode, and
the second communication apparatus comprising:
at least one memory storing instructions; and
at least one processor configured to, upon executing the stored instructions, function as
a receiving unit configured to receive one of the first notification and the second notification transmitted by the first communication apparatus, and
a unit configured to start, if the first notification is received, the connection processing at an arbitrary timing, and starting, if the second notification is received, the connection processing at a timing restricted as compared to the case in which the first notification is received,
wherein in a state where a connection has been established by the connection processing and the first communication apparatus is in the first power mode, the connection is disconnected when a transition to the second power mode is performed.

2. A communication apparatus configured to operate in either a first power mode or a second power mode in which less power is used than in the first power mode, the apparatus comprising:
at least one memory storing instructions; and
at least one processor configured to, upon executing the stored instructions, function as
a unit configured to transmit a notification for connection processing in short-range wireless communication; and
a unit configured to perform a transition of a power mode from the first power mode to the second power mode,
wherein the unit configured to transmit is configured to transmit a first notification, as the notification, during an operation in the first power mode, and
transmit a second notification, as the notification, including restriction information for executing connection processing at a timing restricted as compared to the first notification, during an operation in the second power mode, and
wherein in a state where a connection has been established by the connection processing and the communication apparatus is in the first power mode, the connection is disconnected when the transition to the second power mode is performed.

3. The apparatus according to claim 2, wherein if a connection request that is transmitted in response to the second notification is received, the unit configured to perform a transition is configured to perform transition of the power mode from the second power mode to the first power mode.

4. The apparatus according to claim 3, further comprising a unit configured to execute, if the connection request that is transmitted in response to the second notification is received, the connection processing after transitioning to the first power mode.

5. The apparatus according to claim 2, wherein the unit configured to transmit is configured to transmit the first notification during a first period, and to transmit the second notification during a second period which is longer than the first period.

6. The apparatus according to claim 2, wherein the second notification further includes information indicating a cause of occurrence of transition from the first power mode to the second power mode by the unit configured to perform a transition.

7. The apparatus according to claim 6, further comprising a unit configured to restrict, based on the cause, a function to be activated if transition from the second power mode to the first power mode is performed in response to reception of the connection request to the second notification.

8. The apparatus according to claim 7, wherein the information indicating the cause represents whether the transition to the second power mode occurs by the apparatus being left for a period exceeding a predetermined time or occurs in response to an operation of a power switch.

9. The apparatus according to claim 8, wherein if the cause is the operation of the power switch, the unit configured to restrict is configured to restrict the function to be activated, as compared to the case in which the cause is the apparatus being left for the period exceeding the predetermined time.

10. The apparatus according to claim 9, wherein if the cause is the apparatus being left for the period exceeding the predetermined time, the unit configured to restrict is configured to activate a remote shooting function by image capture unit from an external apparatus and a function for browsing a held shot image, and if the cause is the operation of the power switch, the unit configured to restrict is configured to restrict the remote shooting function.

11. The apparatus according to claim 2, wherein the short-range wireless communication is BLE (Bluetooth Low Energy), the notification is advertising data in BLE, and the restriction information is described in an AD structure.

12. An image capture apparatus comprising:
a communication apparatus defined in claim 2;
an image capture unit; and
a storage unit configured to store an image shot by the image capture unit.

13. A communication apparatus comprising:
at least one memory storing instructions; and
at least one processor configured to, upon executing the stored instructions, function as
a unit configured to receive a notification for short-range wireless communication from an external communication apparatus;
a unit configured to determine whether the received notification includes restriction information indicating that a timing of executing connection processing in the short-range wireless communication is restricted; and
a unit configured to transmit, if the restriction information is not included, a connection request for the connection processing at a first timing, and transmit, if the restriction information is included, the connection request at a second timing restricted more than the first timing,
wherein the second timing is a timing at which execution of a predetermined user operation for the communication apparatus is detected, and
wherein the first timing is a timing that automatically occurs without the predetermined user operation after receiving the notification.

14. The apparatus according to claim 13, wherein the at least one processor further functions as a unit configured to display, on a display unit, presence/absence of an external apparatus currently connected by the short-range wireless communication,
wherein if the notification including the restriction information is received, the unit configured to display is configured to handle an external apparatus of a transmission source of the notification as the currently connected external apparatus in a state in which the short-range wireless communication is disconnected.

15. The apparatus according to claim 13, further comprising a unit configured to display, on a display unit, as currently connected external apparatuses, an external apparatus currently connected by the short-range wireless communication and an external apparatus of a transmission source of the notification including the restriction information.

16. The apparatus according to claim 13, wherein the at least one processor further functions as a unit configured to perform a remote operation of an external apparatus currently connected by the short-range wireless communication and a communication apparatus of a transmission source of the notification including the restriction information.

17. The apparatus according to claim 16, wherein the at least one processor further functions as a unit configured to display, on a display unit, an operation item corresponding to a function operated by the remote operation.

18. The apparatus according to claim 17, wherein the unit configured to transmit is configured to transmit the connection request in response to detection of a user operation for the operation item when the unit configured to perform a remote operation sets, as a target of the remote operation, the communication apparatus of the transmission source of the notification including the restriction information.

19. The apparatus according to claim 18, wherein the unit configured to display is configured to display a predetermined display on the display unit for a period from when the unit configured to transmit transmits the connection request in response to detection of the user operation for the operation item until connection of the short-range wireless communication is completed by the connection processing.

20. The apparatus according to claim 17, wherein in response to detection of the user operation for the operation item, the unit configured to display is configured to display a list of the external apparatus currently connected by the short-range wireless communication and the communication apparatus of the transmission source of the notification including the restriction information, and prompts a user to select a communication apparatus as the target of the remote operation.

21. The apparatus according to claim 17, wherein the notification including the restriction information includes information for determining whether to restrict a function as the target of the remote operation, and if it is determined, based on the information, to restrict the function, the unit configured to perform a remote operation is configured to restrict execution of the restricted function.

22. The apparatus according to claim 21, wherein if an operation item corresponding to the restricted function is selected by a user operation, the unit configured to display is configured to notify that execution of the function is restricted.

23. The apparatus according to claim 21, wherein the unit configured to display is configured to display an operation item corresponding to the restricted function in an inactive state.

24. A control method for a communication apparatus that operates in a first power mode and a second power mode in which less power is used than in the first power mode, comprising:
   transmitting a first notification for connection processing in short-range wireless communication during an operation in the first power mode;
   performing transition of a power mode from the first power mode to the second power mode;
   transmitting a second notification including restriction information for executing the connection processing at a timing restricted more than a timing of execution of the connection processing by the first notification, during an operation in the second power mode; and
   in a state where a connection has been established by the connection processing and the communication apparatus is in the first power mode, disconnecting the connection when the transition to the second power mode is performed.

25. A control method for a communication apparatus, comprising:
   receiving a notification for short-range wireless communication from an external communication apparatus;
   determining whether the notification received in the receiving includes restriction information indicating that a timing of executing connection processing in the short-range wireless communication is restricted; and
   transmitting, if the restriction information is not included, a connection request for the connection processing at a first timing, and transmitting, if the restriction information is included, the connection request at a second timing restricted more than the first timing,
   wherein the second timing is a timing at which execution of a predetermined user operation for the communication apparatus is detected, and
   wherein the first timing is a timing that automatically occurs without the predetermined user operation after receiving the notification.

26. A non-transitory computer-readable storage medium storing a program for causing a computer to execute a control method for a communication apparatus that operates in a first power mode and a second power mode in which less power is used than in the first power mode, the method comprising:
   transmitting a first notification for connection processing in short-range wireless communication during an operation in the first power mode;
   performing transition of a power mode from the first power mode to the second power mode;
   transmitting a second notification including restriction information for executing the connection processing at a timing restricted more than a timing of execution of the connection processing by the first notification, during an operation in the second power mode; and
   in a state where a connection has been established by the connection processing and the communication apparatus is in the first power mode, disconnecting the connection when the transition to the second power mode is performed.

27. A non-transitory computer-readable storage medium storing a program for causing a computer to execute a control method for a communication apparatus, the method comprising:
   receiving a notification for short-range wireless communication from an external communication apparatus;
   determining whether the notification received in the receiving includes restriction information indicating that a timing of executing connection processing in the short-range wireless communication is restricted; and
   transmitting, if the restriction information is not included, a connection request for the connection processing at a first timing, and transmitting, if the restriction information is included, the connection request at a second timing restricted more than the first timing,
   wherein the second timing is a timing at which execution of a predetermined user operation for the communication apparatus is detected, and
   wherein the first timing is a timing that automatically occurs without the predetermined user operation after receiving the notification.

* * * * *